(12) United States Patent
Kim

(10) Patent No.: US 11,128,900 B2
(45) Date of Patent: Sep. 21, 2021

(54) ELECTRONIC DEVICE AND CONTROL METHOD THEREFOR

(71) Applicant: SAMSUNG ELECTRONICS CO., LTD., Suwon-si (KR)

(72) Inventor: Kyungsik Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 16/975,839

(22) PCT Filed: Jan. 14, 2019

(86) PCT No.: PCT/KR2019/000551
§ 371 (c)(1),
(2) Date: Aug. 26, 2020

(87) PCT Pub. No.: WO2019/164127
PCT Pub. Date: Aug. 29, 2019

(65) Prior Publication Data
US 2020/0404346 A1 Dec. 24, 2020

(30) Foreign Application Priority Data
Feb. 26, 2018 (KR) .................. 10-2018-0022628

(51) Int. Cl.
*H04N 21/418* (2011.01)
*H04N 21/2347* (2011.01)
(Continued)

(52) U.S. Cl.
CPC ......... *H04N 21/2347* (2013.01); *H04N 5/913* (2013.01); *H04N 7/1675* (2013.01); *H04N 21/4181* (2013.01); *H04N 21/4367* (2013.01)

(58) Field of Classification Search
CPC ........... H04N 21/2347; H04N 21/4181; H04N 5/913; H04N 7/1675; H04N 21/4367;
(Continued)

(56) References Cited

U.S. PATENT DOCUMENTS 6,507,592 B1 * 1/2003 Hurvig ................ H04L 12/2801
370/503
7,400,728 B2 7/2008 Genevois
(Continued)

FOREIGN PATENT DOCUMENTS

EP 0 893 921 1/1999
KR 10-2004-0030119 4/2004
(Continued)

OTHER PUBLICATIONS

International Search Report for PCT/KR2019/000551 dated May 2, 2019, 5 pages.
(Continued)

*Primary Examiner* — John R Schnurr
(74) *Attorney, Agent, or Firm* — Nixon & Vanderhye, P.C.

(57) ABSTRACT

The present disclosure relates to an electronic apparatus. The electronic apparatus includes a signal receiving unit that may receive a video signal; an interface unit that may communicates with a security processing module; a signal processing unit; and a processor that transmits first data of the video signal received by the signal receiving unit to the security processing module through the interface unit and receives secured second data from the security processing module, controls the signal processing unit to process the received second data for displaying a video, identifies whether continuity of processing of second data by the signal processing unit is limited based on a ratio of a transmission amount of the first data and a transmission
(Continued)

amount of the second data transmitted and received between the interface unit and the security processing module, and performs subsequent processing according to the identification.

15 Claims, 17 Drawing Sheets

(51) Int. Cl.
    *H04N 5/913*     (2006.01)
    *H04N 7/167*     (2011.01)
    *H04N 21/4367*     (2011.01)

(58) Field of Classification Search
    CPC ......... H04N 21/4405; H04N 21/44227; H04N 21/4438; H04N 21/4424; H04N 21/44004; H04N 21/44231; H04N 21/4335; H04N 21/418
    See application file for complete search history.

(56) References Cited

U.S. PATENT DOCUMENTS

| | | | |
|---|---|---|---|
| 7,987,302 | B2 | 7/2011 | Diepstraten et al. |
| 9,602,588 | B2 | 3/2017 | Ulbricht et al. |
| 2004/0250274 | A1 | 12/2004 | Genevois |
| 2005/0047404 | A1* | 3/2005 | Kim .................. H04N 21/4181 370/382 |
| 2008/0168466 | A1* | 7/2008 | Nitta ....................... G06F 9/544 718/105 |
| 2009/0168791 | A1* | 7/2009 | Hamamoto ............. H04L 49/90 370/412 |
| 2009/0254685 | A1 | 10/2009 | Diepstraten et al. |
| 2010/0299448 | A1 | 11/2010 | Cuoq |
| 2014/0089388 | A1 | 3/2014 | Curry et al. |
| 2014/0282685 | A1* | 9/2014 | Beals .................... H04N 21/835 725/31 |
| 2015/0143105 | A1* | 5/2015 | Perrine ............ H04N 21/64715 713/153 |
| 2017/0078711 | A1 | 3/2017 | Martens |
| 2017/0223412 | A1 | 8/2017 | Song et al. |

FOREIGN PATENT DOCUMENTS

| | | |
|---|---|---|
| KR | 10-2012-0060396 | 6/2012 |
| KR | 10-2017-0029710 | 3/2017 |
| KR | 10-2017-0071012 | 6/2017 |
| KR | 10-1765761 | 8/2017 |
| KR | 10-1769370 | 8/2017 |

OTHER PUBLICATIONS

Written Opinion of the ISA for PCT/KR2019/000551 dated May 2, 2019, 11 pages.

Extended Search Report dated Oct. 1, 2020 in counterpart EuropeanPatent Application No. 19757985.7.

* cited by examiner

ELECTRONIC DEVICE AND CONTROL METHOD THEREFOR

This application is the U.S. national phase of International Application No. PCT/KR2019/000551 filed Jan. 14, 2019 which designated the U.S. and claims priority to Korean Patent Application No. 10-2018-0022628 filed Feb. 26, 2018, the entire contents of each of which are hereby incorporated by reference.

FIELD

The present disclosure relates to an electronic apparatus and a control method thereof, and more particularly, to an electronic apparatus capable of communicating with a security processing module and a control method thereof.

DESCRIPTION OF RELATED ART

An electronic apparatus such as a TV or a set-top box may receive and process a video signal. The video signal may be a signal including paid content. In this case, the video signal may be secured so that only a user with legitimate authority may use content.

In processing the secured video signal, technologies using a security processing module (for example, a conditional access module (CAM)) which is a separate module from an electronic apparatus have been known. The security processing module may communicate with the electronic apparatus via a universal serial bus (USB) interface (so-called USB CAM scheme).

In the USB CAM scheme, a plurality of data pipes for data transmission may be configured between the electronic apparatus and the security processing module. For example, when a plurality of video services using video signals such as satellite broadcasting, cable broadcasting, IPTV, and over the top (OTT) are executed, individual data pipes are configured for each video service, and as a result, video data of each video service may be transmitted/received between the electronic apparatus and the security processing module However, individual data pipes are a logical concept, and each pipe is not formed physically independently and in parallel.

On the other hand, in the USB CAM scheme, a relatively larger amount of data, such as the video data, are mainly transmitted through a bulk transfer scheme. However, the bulk transfer scheme does not guarantee priority of data transmission between the respective pipes. That is, the bulk transfer scheme transmits data with the same priority for each pipe, which means that data transmission through one pipe can be affected by data transmission through another pipe. For example, in a situation in which video data is transmitted and received through only one first pipe, when another video data is transmitted and received through a second pipe, the speed of the transmission and reception of the video data through the first pipe may be generally reduced due to the addition of the second pipe. As a result, for example, when a streaming video is played, a problem may occur in that the video is continuously processed and played, such as interruption in video playback.

SUMMARY

Accordingly, the present disclosure is to provide an electronic apparatus capable of continuously processing and playing video.

According to an aspect of the present disclosure, an electronic apparatus includes: a signal receiving unit that may receive a video signal; an interface unit that may communicate with a security processing module; a signal processing unit; and a processor that transmits first data of the video signal received by the signal receiving unit to the security processing module through the interface unit and receives secured second data from the security processing module, controls the signal processing unit to process the received second data for displaying a video, identifies whether continuity of processing of second data by the signal processing unit is limited based on a ratio of a transmission amount of the first data and a transmission amount of the second data transmitted and received between the interface unit and the security processing module, and performs subsequent processing according to the identification.

As a result, the video can be continuously processed and played without interruption.

The processor may identify whether the continuity of the processing of the second data is limited based on a change in the ratio of the transmission amount of the first data and the transmission amount of the second data.

The interface unit may include a transmit buffer in which the first data to be transmitted to the security processing module is stored and a receive buffer in which the second data transmitted from the security processing module is stored, and the processor may compare a change in an amount of data transmitted from the transmit buffer with a change in an amount of data stored in the receive buffer to identify whether the continuity of the processing of the second data is limited.

As a result, it may be easily identified whether the continuity of the video processing is limited based on the change in the data transmission amount.

The processor may identify whether the continuity of the processing of the second data is limited based on a change in time required for the data transmitted from the transmit buffer to reach the receive buffer through the security processing module.

As a result, it may be easily identified whether the continuity of the video processing is limited based on the time required for the data transmission.

The processor may identify whether the continuity of the processing of the second data by the signal processing unit is limited in response to an occurrence of an event of changing the transmission amount of the first data or the second data of the video signal.

As a result, it is possible to utilize resources of the electronic apparatus more efficiently as compared with the case where it is constantly identified whether the continuity is limited.

The processor identify whether the continuity of the processing of the second data of a first video signal or the processing of the second data of a second video signal by the signal processing unit is limited in response to a request to process the second video signal during the processing of the first video signal.

The electronic apparatus may further include a display unit, in which the subsequent processing may include displaying the identification result through the display unit.

The electronic apparatus may further include a user input unit, in which the processor may perform the subsequent processing according to a user input received through the user input unit in response to the limitation of the continuity.

As a result, it is possible to perform the subsequent processing more suited to a user's intention.

The processor may identify whether the continuity of the processing of the second data by the signal processing unit is limited based on a trend of change in a relationship of the transmission amount of the second data with respect to the transmission amount of the first data.

As a result, the reliability of discrimination on whether or not the continuity of processing of data is limited is improved.

According to another aspect of the present disclosure, a control method of an electronic apparatus including an interface unit that communicates with a security processing module includes: receiving a video signal; transmitting first data of the received video signal to the security processing module through the interface unit; receiving secured second data from the security processing module; processing the received second data for displaying a video; identifying whether continuity of processing of second data is limited based on a ratio of a transmission amount of the first data and a transmission amount of the second data transmitted and received between the interface unit and the security processing module; and performing subsequent processing according to the identification.

As a result, the video can be continuously processed and played without interruption.

The identifying may comprise whether the continuity of the processing of the second data is limited based on the change in the ratio of the transmission amount of the first data and the transmission amount of the second data.

The interface unit may include a transmit buffer in which the first data to be transmitted to the security processing module is stored and a receive buffer in which the second data transmitted from the security processing module is stored, and the identifying may comprise whether the continuity of the processing of the second data is limited by comparing a change in an amount of data transmitted from the transmit buffer with a change in an amount of data stored in the receive buffer.

As a result, it may be easily identified whether the continuity of the video processing is limited based on the change in the data transmission amount.

The identifying may comprise whether the continuity of the processing of the second data is limited based on a change in time required for the data transmitted from the transmit buffer to reach the receive buffer through the security processing module.

As a result, it may be easily identified whether the continuity of the video processing is limited based on the time required for the data transmission.

The identifying may comprise whether the continuity of the processing of the second data by the signal processing unit is limited in response to an occurrence of an event of changing the transmission amount of the first data or the second data of the video signal.

As a result, it is possible to utilize the resources of the electronic apparatus 100 more efficiently than in the case of constantly identifying whether the continuity is limited.

The identifying may comprise whether the continuity of the processing of the second data of a first video signal or the processing of the second data of a second video signal by the signal processing unit is limited in response to a request to process the second video signal during the processing of the first video signal.

The subsequent processing may include displaying the identification result through the display unit.

The processor may perform the subsequent processing according to a user input received through the user input unit in response to the limitation of the continuity.

As a result, it is possible to perform the subsequent processing more suited to the user's intention.

The identifying may comprise whether the continuity of the processing of the second data by the signal processing unit is limited based on a trend of change in a relationship of the transmission amount of the second data with respect to the transmission amount of the first data.

As a result, the reliability of discrimination on whether or not the continuity of processing of data is limited is improved.

A computer program according to the embodiment of the present disclosure is a computer program stored in a medium to execute the control method by being combined with the electronic apparatus.

The computer program is stored in the medium in the server and may be downloaded to the electronic apparatus through the network As described above, according to the present disclosure, it is possible to continuously process and play video.

DETAILED DESCRIPTION OF EXAMPLE EMBODIMENTS

Figure 1:
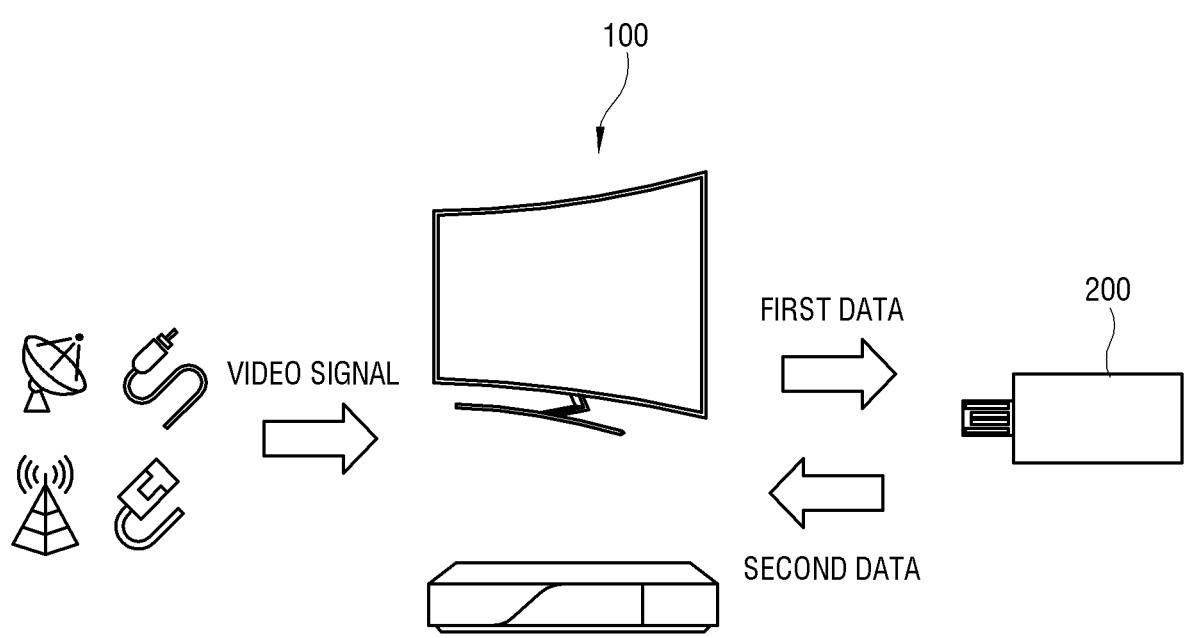
FIG. 1 is a diagram schematically illustrating an operation of an electronic apparatus according to an embodiment of the present disclosure.

Hereinafter, embodiments of the present disclosure will be described in detail with reference to the accompanying drawings. In the drawings, the same reference numbers or signs refer to components that perform substantially the same function, and the size of each component in the drawings may be exaggerated for clarity and convenience. However, the technical idea and the core configuration and operation of the present disclosure are not limited only to the configuration or operation described in the following examples. In describing the present disclosure, if it is determined that a detailed description of the known technology or configuration related to the present disclosure may unnecessarily obscure the subject matter of the present disclosure, the detailed description thereof will be omitted.

In embodiments of the present disclosure, terms including ordinal numbers such as first and second are used only for the purpose of distinguishing one component from other components, and singular expressions include plural expressions unless the context clearly indicates otherwise. Also, in embodiments of the present disclosure, it should be understood that terms such as 'configured', 'include', and 'have' do not preclude the existence or addition possibility of one or more other features or numbers, steps, operations, components, parts, or combinations thereof. In addition, in the embodiment of the present disclosure, a 'module' or a 'unit' performs at least one function or operation, and may be implemented in hardware or software, or a combination of hardware and software, and may be integrated into at least one module and implemented as at least one processor. In addition, in embodiments of the present disclosure, at least one of a plurality of elements refers to not only all of the plurality of elements, but also each one or all combinations thereof excluding the rest of the plurality of elements. A term "configured (or set) to" may not necessarily mean "specifically designed to" in hardware. Instead, an expression "an apparatus configured to" may mean that the apparatus may "perform~" together with other apparatuses or components. For example, a "processor configured (or set) to perform A, B, and C" may mean a dedicated processor (for example, an embedded processor) for performing the corresponding operations or a generic-purpose processor (for example, a central processing unit (CPU) or an application processor) that may perform the corresponding operations by executing one or more software programs stored in a memory apparatus. In addition, when it is mentioned that any component (for example, a first component) is (operatively or communicatively} coupled with/to or is connected to another component (for example, a second component), it is to be understood that any component is directly coupled to another component or may be coupled to another component through the other component (for example, a third component).

FIG. 1 illustrates an electronic apparatus 100 according to an embodiment of the present disclosure. The electronic apparatus 100 according to the embodiment of the present disclosure may be implemented as, for example, a set top box. In addition, an electronic apparatus 100 according to another embodiment of the present disclosure may be implemented as a display device including a display unit, for example, wearable apparatuses such as a TV, a smartphone, a tablet, a mobile phone, a smart watch, and a head-mounted display, and apparatuses such as a computer, a multimedia player, an electronic frame, a digital billboard, a large format display (LFD), and a digital signage. However, the display device 100 according to the embodiment of the present disclosure is not limited thereto, and any apparatus capable of processing a video signal may be used.

An operation of the electronic apparatus 100 according to the embodiment of the present disclosure will be schematically described with reference to FIG. 1.

The electronic apparatus 100 according to the embodiment of the present disclosure receives a video signal. There is no particular limitation on a type of video signals that the electronic apparatus 100 receives. For example, the electronic apparatus 100 may receive a terrestrial broadcast signal, a satellite broadcast signal, a cable broadcast signal, an IPTV video signal, and an over the top (OTT) video signal. The video signal may further include audio data for outputting audio or additional information data for providing additional information.

The video signal may be secured to prevent unauthorized use of content included in the video signal. For example, the video signal can be encrypted by a conditional access system (CAS). Specifically, when the video signal is a broadcast signal conforming to a DVB standard, the video signal may be encrypted according to standards of DVB-conditional access (DVB-CA), DVB-common scrambling algorithm (DVB-CSA), and DVB-common interface (DVB-CI). However, the security processing for the video signal is not limited to processing by a specific system, such as the conditional access system, and includes all of various types of processing so that content cannot be used without security release processing.

A security processing module 200 for security release of a video signal may be connected to the electronic apparatus 100 according to the embodiment of the present disclosure. The security processing module 200 may be provided as a separate device from the electronic apparatus 100. The security processing module 200 may be implemented as, for example, a conditional access module (CAM). However, the security processing module 200 of the present disclosure is not limited to a specific module such as the conditional access module, and includes all various types of modules for security release of the video signal.

The electronic apparatus 100 extracts data of secured content from the received video signal, and transmits the extracted data to the security processing module 200. The security processing module 200 checks a user's right to use the received content data. When the user's right to use the content data is checked, the security processing module 200 performs security release processing on the content data. For example, the security processing module 200 may descramble scrambled content data. The security processing module 200 transmits the data of the secured content to the electronic apparatus 100. The security processing module 200 may encrypt the descrambled content data again and transmit the encrypted descrambled data to the electronic apparatus 100 in order to enhance security of the content. For convenience of description below, the data transmitted from the electronic apparatus 100 to the security processing module 200 is referred to as first data of the video signal, and data transmitted from the security processing module 200 to the electronic apparatus 100 is referred to as second data of the video signal.

An auxiliary module may be further used in security processing for content data. The auxiliary module may be connected to the security processing module 200 and may provide information related to a user's use right for content to the security processing module 200. The auxiliary module may be implemented in a configuration having an integrated circuit containing user's use right information, for example, a form such as a smart card. When the auxiliary module is used, the security processing module 200 may perform the security release processing on the content based on the user's authority information provided from the auxiliary module.

Figure 2:
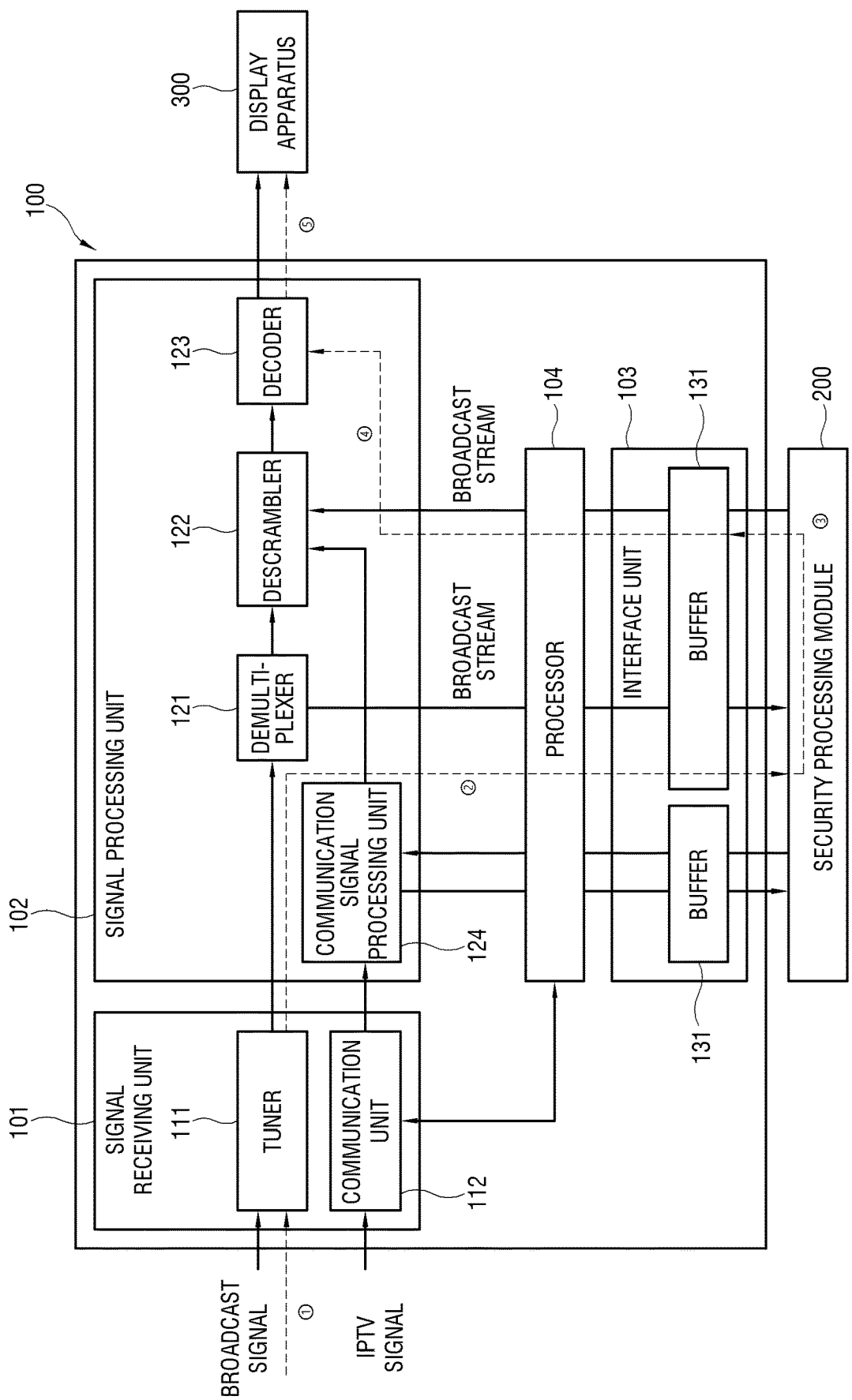
FIG. 2 is a diagram illustrating a configuration and a data transmission flow of the electronic apparatus according to the embodiment of the present disclosure.

FIG. 2 is a diagram illustrating a configuration of the electronic apparatus 100 according to the embodiment of the present disclosure. The electronic apparatus 100 according to the embodiment of the present disclosure includes a signal receiving unit 101, a signal processing unit 102, an interface unit 103, and a processor 104. However, the configuration of the electronic apparatus 100 illustrated in FIG. 2 is only an example, and the electronic apparatus according to the embodiment of the present disclosure may be implemented in another configuration. That is, the electronic apparatus according to the embodiment of the present disclosure may be implemented by adding other configurations in addition to the configuration illustrated in FIG. 2 or by excluding a part of the configurations illustrated in FIG. 2.

The signal receiving unit 101 receives a video signal. The signal receiving unit 101 may include a tuner 111 for receiving a broadcast signal or the like in the form of an RF signal. The tuner may tune and receive a broadcast signal of any one channel selected by a user among a plurality of channels.

The signal receiving unit 101 may include a communication unit 112 that receives a video signal such as an IPTV signal by communicating with an external device. The communication unit 112 may perform communication in a wired or wireless manner. For example, the communication unit 112 includes a connection unit for wired communication, in which the connection unit may transmit/receive signal/data according to standards such as high definition multimedia interface (HDMI), consumer electronics control (HDMI-CFC), USB, and component, and may include at least one connector or terminal corresponding to each of these standards. The communication unit 112 may perform wired communication with a plurality of servers through a wired local area network (LAN).

The communication unit 112 may be implemented in various other communication schemes in addition to the connection unit including the connector or the terminal for wired connection. For example, the communication unit 112 may be configured to perform one or more communications of Wi-Fi, WiFi direct, Ethernet, Bluetooth, Bluetooth low energy (BLE), serial port profile (SPP), Zigbee, infrared communication, radio control, ultra-wide band (UWM), wireless USB, and near field communication (NFC). The communication unit 112 may be implemented in the form of a device, a S/W module, a circuit, a chip, and the like.

The signal receiving unit 101 may receive a video signal from an external device such as a camera, a server, a USB storage device, a DVD, and a computer.

The signal processing unit 102 processes a video signal. The signal processing unit 102 may process the video signal received through the signal receiving unit 101 or process the video signal transmitted from the security processing module 200 through the interface unit 103.

A type of video processing that the processor 102 can perform is not limited. For example, the signal processing unit 102 may further include a demultiplexer 121 that divides a stream of an input signal into each stream of video, audio, and additional data, a descrambler 122 that generates original data from a random code series created by a scrambler, a decoder 123 that decodes a coded signal, and a deinterlacer that converts an interlace type video stream into a progressive type video stream, thereby performing each video processing. In addition, the signal processing unit 102 may perform scaling that adjusts a video stream to a preset resolution, noise reduction for image quality improvement, detail enhancement, frame refresh rate conversion, and the like.

The signal processing unit 102 may further include a communication signal processing unit 124 that processes signals received through the communication unit 112. The communication signal processing unit 124 may analyze, for example, a structure of a communication packet received through the communication unit 112 and perform processing accordingly.

The interface unit 103 may transmit and receive data of a video signal to and from the security processing module 200. That is, the interface unit 103 may transmit the first data of the video signal to the security processing module 200 and receive the second data of the video signal from the security processing module 200. The interface unit 103 may be implemented as a USB interface, but the type of interface that can be implemented is not limited thereto. The interface 103 may further include a buffer 131 in which the first data and the second data are stored. The buffer 131 may be configured by being divided into a transmit buffer in which the first data to be transmitted to the security processing module 200 is stored and a receive buffer in which the second data transmitted from the security processing module 200 is stored.

The processor 104 may perform control to operate the overall configurations of the display device 100. The processor 104 may include control programs (or instructions) for performing the control operation, a nonvolatile memory in which the control programs are installed, a volatile memory in which at least a part of the installed control programs is loaded, and at least one process or a central processing unit (CPU) in which the loaded control programs are executed. In addition, such a control program may also be stored in electronic devices other than the electronic apparatus 100.

The control program may include a program(s) implemented in at least one of a BIOS, a device driver, an operating system, firmware, a platform, and an application program (application). As an embodiment, the application program may be pre-installed or stored in the electronic apparatus 100 at the time of manufacturing of the electronic apparatus 100, or installed in the electronic apparatus 100 based on data of the application program received from the outside when used later. The data of the application program may be downloaded from an external server, such as an application market, to the electronic apparatus 100, but is not limited thereto. Meanwhile, the processor 104 may be implemented in the form of a device, a S/W module, a circuit, and a chip, or a combination thereof.

The processor 104 may control the signal receiving unit 101 to receive the video signal, for example. The processor 104 may control the signal processing unit 102 to perform signal processing, or may control the interface unit 103 to communicate with the security processing module 200. The electronic apparatus 100 illustrated in FIG. 2 is implemented as a configuration that performs processing and control together in one processor 104, which is only an example, and an electronic apparatus 100 according to another embodiment of the present disclosure may be implemented in a configuration further including a processing unit or a control unit separately from the processor.

The processor 104 may transmit the video signal processed by the signal processing unit 102 to a display device 300 outside the electronic apparatus 100 to display the video signal. Alternatively, the electronic apparatus 100 according to the embodiment of the present disclosure may directly display the processed video by including a display unit. The implementation scheme of the display unit is not limited, and the display unit may be implemented in various display schemes such as a liquid crystal, plasma, a light-emitting diode, an organic light-emitting diode, a surface-electron gun conduction electron-emitter, carbon nano-tube, and nano-crystal. In the case of the liquid crystal scheme, the display unit includes a liquid crystal display panel, a backlight unit that supplies light to the liquid crystal display panel, a panel driving unit that drives the liquid crystal display panel, and the like. The display unit may be implemented as an OLED panel that is a self-luminous element without the backlight unit.

Hereinafter, an operation of the electronic apparatus 100 and a data transmission flow in the electronic apparatus 100 according to the embodiment of the present disclosure will be described with reference to FIGS. 4 and 2.

The electronic apparatus 100 according to the embodiment of the present disclosure receives the video signal through the signal receiving unit 101 (S401). As a specific example, the processor 104 of the electronic apparatus 100 may control the tuner 111 of the signal receiving unit 101 to receive the broadcast signal. Accordingly, the video signal is received by the signal receiving unit 101 (① in FIG. 2).

The processor 104 may control the signal receiving unit 101 and the interface unit 103 so that the first data of the video signal received by the signal receiving unit 101 is transmitted to the security processing module 200 through the interface unit 103 (S402). Alternatively, the processor 104 may perform control to allow the signal processing unit 102 to first process the video signal received by the signal receiving unit 101 and then transmit the first data of the video signal to the security processing module 200 through the interface unit 103. As a specific example, the processor 104 performs control to allow the demultiplexer 121 of the signal processing unit 102 to demultiplex the broadcast signal received through the tuner 111 and then transmit the demultiplexed data to the security processing module 200 through the interface unit 103. Accordingly, the first data (optionally after passing through the signal processing unit 102) of the video signal received through the signal receiving unit 101 is transmitted to the security processing module 200 through the interface unit 103 (② in FIG. 2).

The processor 104 may control the interface unit 103 to receive the second data processed by the security processing module 200 for the first data of the video signal (S403). Accordingly, the second data of the video signal is transmitted from the security processing module 200 to the interface unit 103 (③ in FIG. 2).

The processor 104 may control the signal processing unit 102 to process the second data received through the interface unit 103 for displaying a video (S404). Accordingly, the second data of the video signal is transmitted from the interface unit 103 to the signal processing unit 102 (④ in FIG. 2).

Thereafter, the processor 104 may control the signal processing unit 102 so that the second data processed through the signal processing unit 102 is output to the display device 300 or the display unit. Accordingly, the data processed for the second data of the video signal is transmitted from the signal processing unit 102 to the display device 300 or the display unit and displayed (⑤ in FIG. 2).

As described above, the video signal or the data of the video signal is transmitted and processed according to a series of continuous flows until it is displayed and played after being received by the electronic apparatus 100. When continuity of such processing is limited in the electronic apparatus 100, problems such as interruption in video playback may occur. In particular, such problems may be more sensitive when the video signal is processed and played in real time, such as real-time broadcast playback or streaming video playback.

There may be various reasons for the limitation in the continuity of video data processing in the electronic apparatus 100. As described above, various components such as the signal receiving unit 101, the signal processing unit 102, and the interface unit 103 are involved in the processing of data, and therefore, the continuity of the processing of the data may be limited by a processing delay of each component or the transmission delay between each component.

In particular, in the case of present disclosure which performs the security release processing through the security processing module 200, a transmission flow of the first data or the second data of the video signal transmitted between the interface unit 103 and the security processing module 200 of the electronic apparatus 100 is not smooth, and therefore, the processing of the second data by the signal processing unit 102 is affected, which is one of the reasons that the continuity of the processing of the data may be limited.

Accordingly, the processor 104 of the electronic apparatus 100 according to the embodiment of the present disclosure identifies whether continuity of the processing of the second data by the signal processing unit 102 is limited based on a ratio of a transmission amount of the first data and a transmission amount of the second data of the video signal transmitted and received between the interface unit 103 and the security processing module 200, and performs the subsequent processing accordingly. Details of this will be described later.

Thereby, the video can be continuously processed and played.

Figure 3:
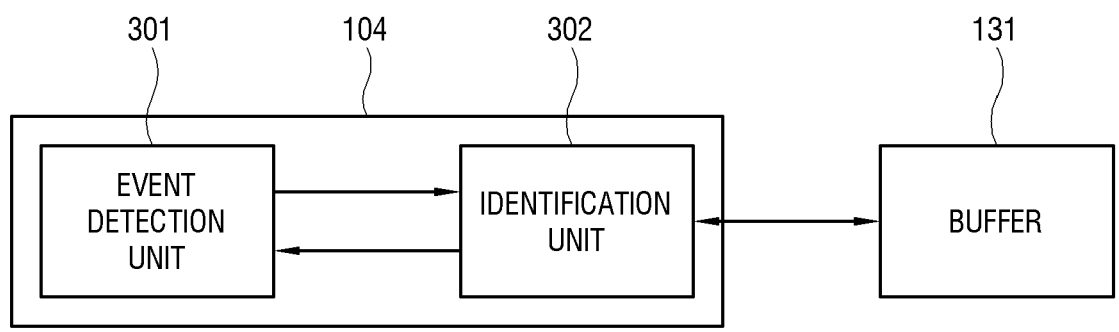
FIG. 3 is a diagram illustrating a detailed configuration and operation of a processor according to an embodiment of the present disclosure.

The processor 104 may identify whether the continuity of the processing of the second data is limited in response to an occurrence of a predetermined event. For example, the processor 104 may identify whether to limit the continuity of the processing of the second data in response to an occurrence of an event of increasing the transmission amounts of the first data or the second data transmitted to the security processing module 200. In this case, the processor 104 may operate to execute an event detection unit 301 and an identification unit 302 as illustrated in FIG. 3. Here, the event detection unit 301 and the identification unit 302 may be implemented as software or control programs. Hereinafter, operations performed by allowing the processor 104 to execute these software/control programs may be described as operations of the corresponding software/control programs for convenience.

As an example of the operations of the event detection unit 301 and the identification unit 302 executed by the processor 104, the event detection unit 301 may detect whether the event occurs, and if it is detected that the event occurs, when a signal is transmitted to the identification unit 302, the identification unit 302 may identify whether the continuity of the processing of the second data is limited by a predetermined method according to the signal, for example, by monitoring the buffer 131 of the interface unit 103, and transmit the identified result to the event detection unit 301 to perform the subsequent processing. Thereby, that is, if it is identified whether the continuity of the processing of the second data is limited in response to the occurrence of the event, resources of the electronic apparatus 100 can be utilized more efficiently as compared with the case where it is constantly identified whether the continuity is limited. The types of the event and the detailed contents of the operations according to the types will be described later.

Hereinafter, a situation of identifying whether a transmission flow of the video data transmitted between the interface unit 103 and the security processing module 200 and the continuity of the processing of the data are limited will be described with reference to FIGS. 5 to 8.

Figure 5:
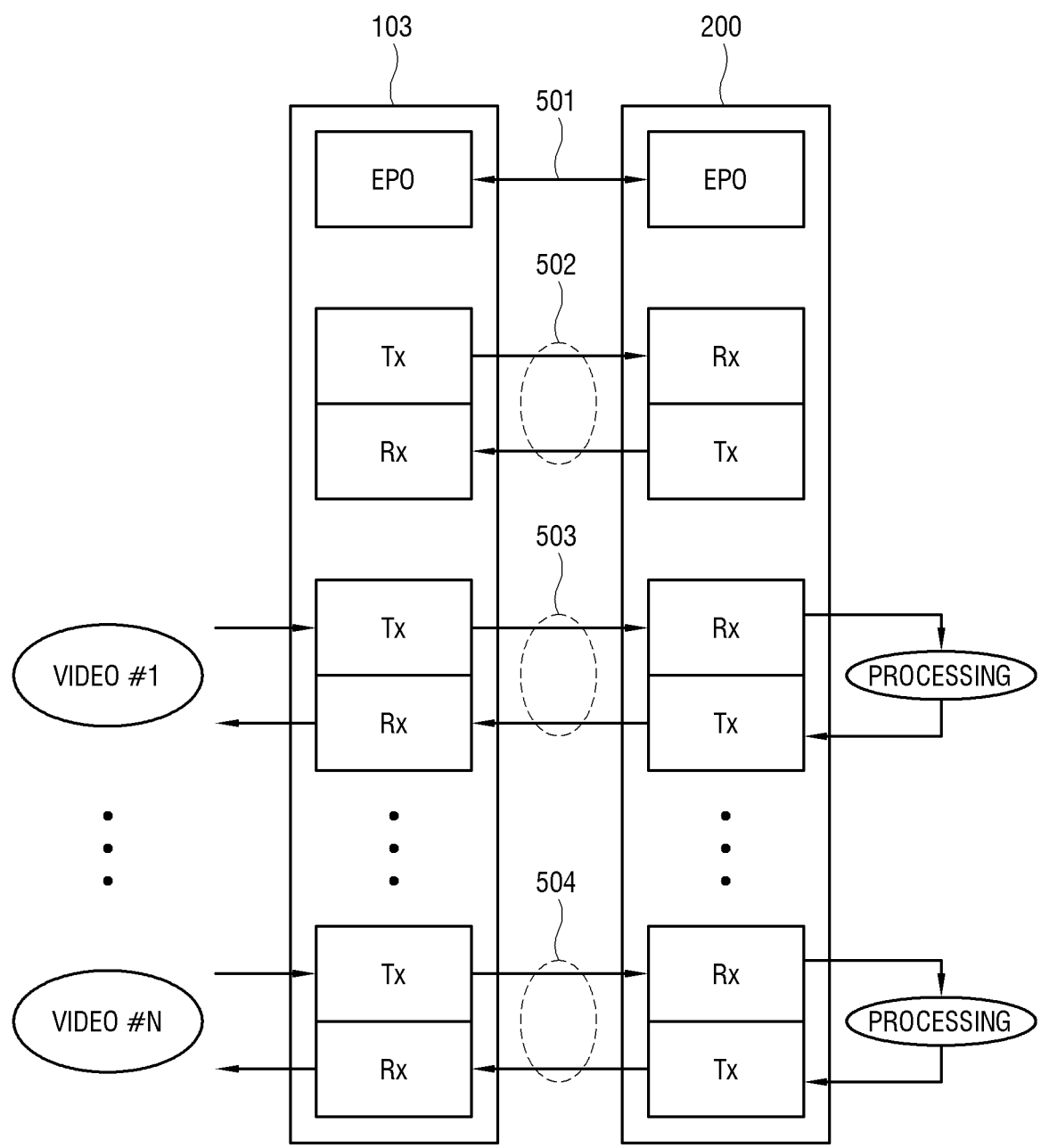
FIG. 5 is a diagram illustrating data transmission between the electronic apparatus according to the embodiment of the present disclosure and a security processing module.

When a USB interface is used as a data transmission interface between the interface unit 103 and the security processing module 200, control signals and data are transmitted through a pipe between the interface unit 103 and the security processing module 200. For example, as illustrated in FIG. 5, the control signal or data may be transmitted and received between the interface unit 103 and the security processing module 200 through a USB control pipe 501, a command and control pipe 502, and a plurality of data pipes 503 to 504. In that case, the video data according to each video signal may be transmitted and received between the interface unit 103 and the security processing module 200 through each of the data pipes 503 to 504. For example, when describing the case where the video data according to the terrestrial broadcast signal and the video data according to the OTT video signal are transmitted and received between the interface unit 103 and the security processing module 200, the processor 104 may transmit the secured first data as the video signal according to the terrestrial broadcast signal from the interface unit 103 to the security processing module 200 through the first pipe 503. The second data processed by the security processing module 200 for the above data may be transmitted from the security processing module 200 to the interface unit 103 through the first pipe 503 again. In addition, the processor 104 may transmit the secured first data as the video data according to the OTT video signal from the interface 103 to the security processing module 200 through the second pipe 504. The second data processed by the security processing module 200 for the above data may be transmitted from the security processing module 200 to the interface unit 103 through the second pipe 504 again.

The buffer 131 of the interface unit 103 may be used for the data transmission between the interface unit 103 and the security processing module 200. The buffer 131 may be provided to correspond to each data transmission pipe between the interface unit 103 and the security processing module 200. The buffer 131 may include transmit buffers 132 and 134 in which the first data to be transmitted to the security processing module 200 is stored and receive buffers 133 and 135 in which the second data transmitted from the security processing module 200 is stored. Hereinafter, an example of the data transmission using the buffer 131 will be described in detail with reference to FIG. 6.

For example, when the video data according to the terrestrial broadcast signal and the video data according to the OTT video signal are transmitted and received between the interface unit 103 and the security processing module 200, the processor 104 stores the first data of the terrestrial broadcast signal in the transmit buffer 132 of the first pipe 503 corresponding thereto. The first data stored in the transmit buffer 132 is sequentially transmitted to the security processing module 200 and is processed. The second data, which is processed by the security processing module 200 for the first data, is sequentially transmitted to the receive buffer 133 corresponding to the transmit buffer 132 through the first pipe 503 and stored. The second data stored in the receive buffer 133 is sequentially processed by the signal processing unit 102 later.

The video data according to the OTT video signal is also transmitted in the same way. That is, the processor 104 stores the first data of the OTT video signal in the transmit buffer 134 of the second pipe 504 corresponding thereto. The first data stored in the transmit buffer 134 is sequentially transmitted to the security processing module 200 and is processed. The second data, which is processed by the security processing module 200 for the first data, is sequentially transmitted to the receive buffer 134 corresponding to the transmit buffer 135 through the second pipe 504 and stored. The second data stored in the receive buffer 135 is sequentially processed by the signal processing unit 102 later.

Figure 7:
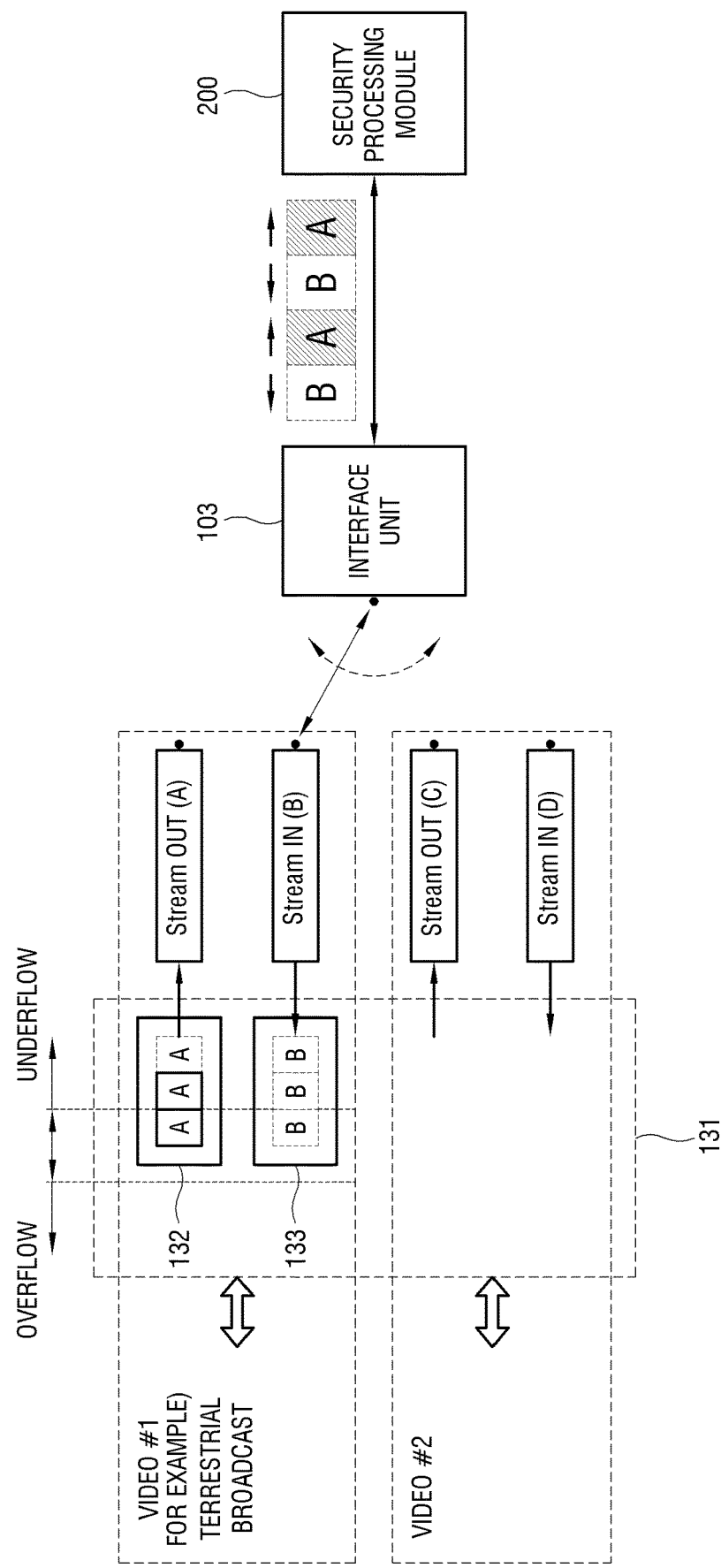
FIG. 7 is a diagram illustrating an example of a data processing state of the electronic apparatus according to the embodiment of the present disclosure.

When the buffer 131 of the interface 103 is used for the data transmission between the interface 103 and the security processing module 200, if underflow or overflow does not occur in the buffer 131, the continuity of the processing of the data between the interface unit 103 and the security processing module 200 and the continuity of the processing of the second data transmitted from the security processing module 200 may not be limited. For example, in the process that the video data according to the terrestrial broadcast signal reaches the security processing module 200 through the interface unit 103 and is processed and returns to the interface unit 103 again, as illustrated in FIG. 7, if the underflow or overflow does not occur in both the transmit buffer 132 and the receive buffer 133, the continuity of processing for the above data may not be limited.

Figure 8:
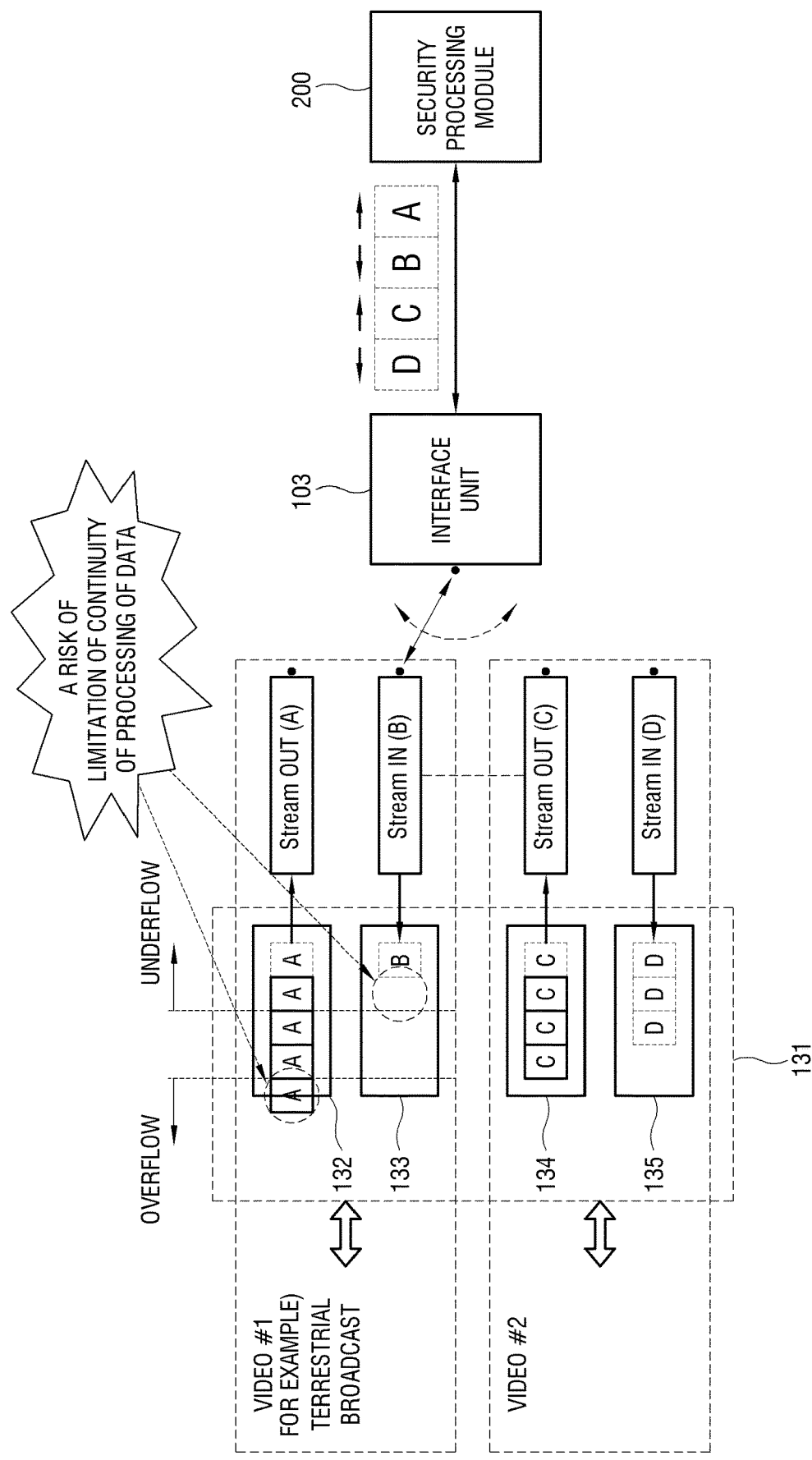
FIG. 8 is a diagram illustrating another example of the data processing state of the electronic apparatus according to the embodiment of the present disclosure.

However, as illustrated in FIG. 8, if the underflow or overflow occurs in any one of the transmit buffer 132 and the receive buffer 133, the continuity of processing for the above data may be limited. When the overflow occurs in the buffer 131, for example, when the overflow occurs in the transmit buffer 132, there may be data that is transmitted to the transmit buffer 132 but is lost without stored in the transmit buffer 132, so the continuity of processing may be limited due to the data loss. Even when the underflow occurs in the buffer 131, the continuity of the processing of the data may be limited. For example, when the underflow occurs in the receive buffer 133, in the process of processing the second data stored in the receive buffer 133 by the signal processing unit 102, a situation may occur in which there is no data stored in the receive buffer 133 later, and therefore, the signal processing unit 102 may have no data to process, so the continuity of the processing of the data may be limited.

Figure 6:
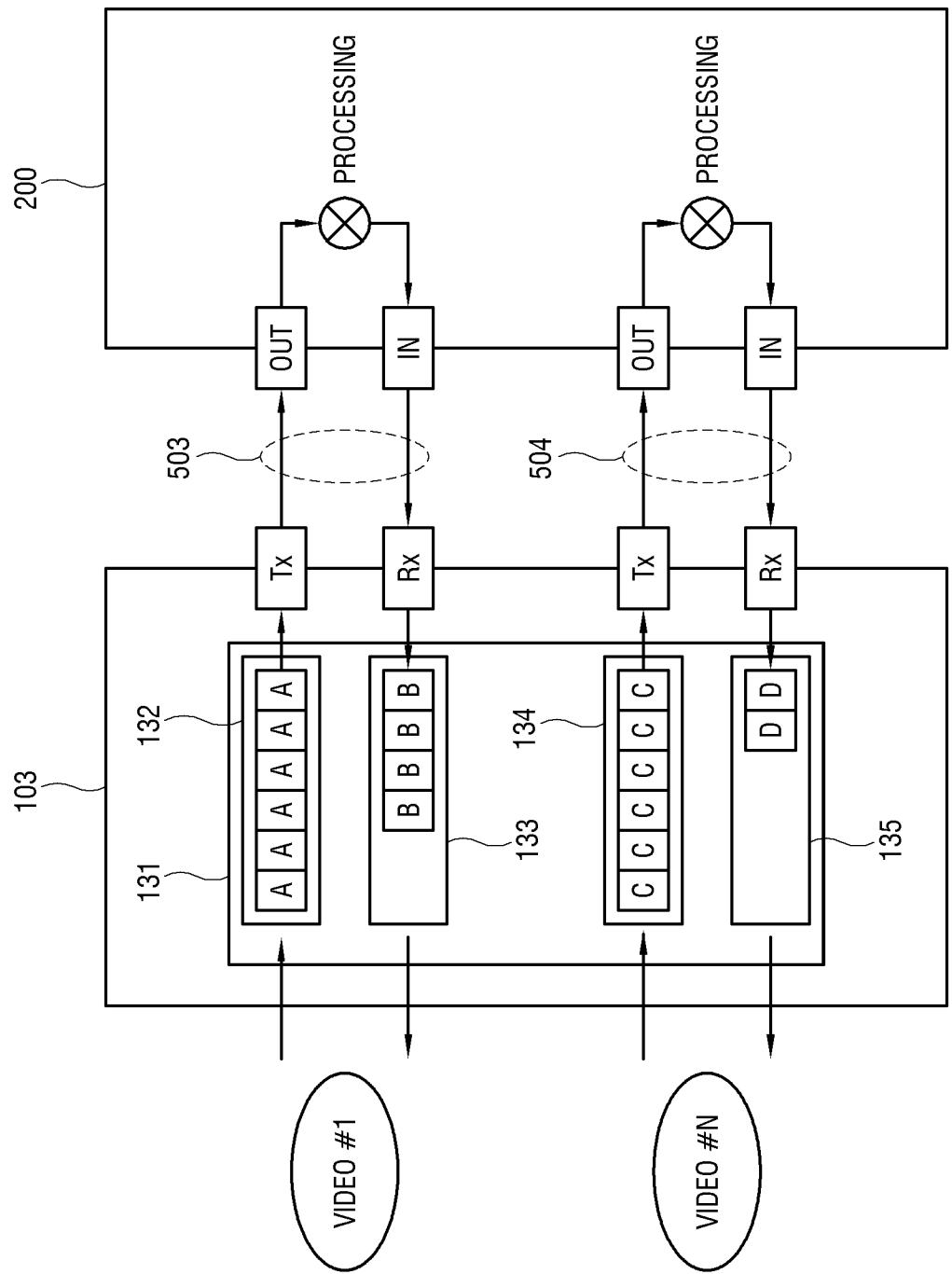
FIG. 6 is a diagram illustrating a detailed configuration (buffer) of an interface unit of the electronic apparatus according to the embodiment of the present disclosure.

The possibility of the overflow or underflow of the buffer 131 may increase as data of a plurality of video signals are transferred between the interface unit 103 and the security processing module 200. This is because a bulk transfer scheme, which is mainly used when a relatively large amount of data such as video data is transmitted from the USB interface, does not secure priority of data transmission between the respective pipes. For example, as illustrated in FIG. 6 or 8, when data of a first video signal and data of a second video signal are transmitted between the interface unit 103 and the security processing module 200, logically, each pipe 503 and 504 may be distinguished, but each pipe is not formed physically independently and in parallel, but substantially competes for one transmission line, and therefore, when the transmission amount of data through the second pipe 504 increases, as illustrated in FIG. 8, the transmission amounts of the first data and the second data through the first pipe 503 are relatively reduced, so the underflow may occur in the receive buffer 133 and the overflow may occur in the transmit buffer 132.

In order to prevent the problems described above, the processor 104 of the electronic apparatus 100 according to the embodiment of the present disclosure identifies whether the continuity of the processing of the second data by the signal processing unit 102 is limited based on the ratio of the transmission amount of the first data and the transmission amount of the second data of the video signal transmitted and received between the interface unit 103 and the security processing module 200, and performs the subsequent processing accordingly. For example, the processor 104 may check whether the ratio of the transmission amount of the first data and the transmission amount of the second data of the video signal is kept constant to identify that the continuity of the processing of the second data is not limited when the ratio is maintained, and otherwise, to identify that the continuity of the processing of the second data is limited. Here, as the method of checking whether the ratio of the data transmission of the first data and the transmission amount of the second data is kept constant, the method of checking whether the ratio of the transmission amount of the first data and the transmission amount of the second data is maintained to a value within a predetermined range for a predetermined period of time is possible, but is not limited thereto. In addition, the transmission amount of the first data and the transmission amount of the second data may be the transmission amount measured for different times. For example, the processor 104 may identify whether to the continuity of the processing of the second data is limited based on the ratio between the transmission amount of the first data measured at a specific time t and the transmission amount of the second data measured at a t+d time after an s time lapses therefrom.

As another example of identifying whether the continuity of the processing of the second data by the signal processing unit 102 is limited, the processor 104 may identify whether the continuity of the processing of the second data is limited based on a 'change' in the ratio of the transmission amount of the first data and the transmission amount of the second data. For example, the processor 104 may calculate a degree of change in the ratio of the transmission amount of the first data and the transmission amount of the second data of the video signal is kept constant, and may identify that the continuity of the processing of the second data is not limited when the degree of change is within a predetermined value, and otherwise, identify that the continuity of the processing of the second data is limited. Here, as the method of calculating the degree of change in the ratio of the transmission amount of the first data and the transmission amount of the second data of the video signal, a method of calculating a standard deviation between a plurality of ratio values calculated for multiple times is possible, but is not limited thereto.

As another example of identifying whether the continuity of the processing of the second data by the signal processing unit 102 is limited, the processor 104 may identify whether the continuity of the processing of the second data is limited based on presence or absence of a correlation or correspondence of the transmission amount of the first data and the transmission amount of the second data. As a specific example, the processor 104 compares the change in the amount of data transmitted from the transmit buffer 132 with the change in the amount of data stored in the receive buffer 133 to identify whether the continuity of the processing of the second data is limited. This will be described in detail with reference to FIGS. 9 to 10.

The processor 104 of the electronic apparatus 100 according to the present embodiment monitors the transmit buffer 132 of the interface unit 103 and records the change in the amount of data transmitted from the transmit buffer 132. In addition, the processor 104 monitors the receive buffer 133 of the interface 103 and also records the change in the amount of data stored in the receive buffer 133. Thereafter, the processor 104 compares the change in the amount of data transmitted from the transmit buffer 132 with the change in the amount of data stored in the receive buffer 133 to identify whether the continuity of the processing of the second data is limited.

Figure 9:
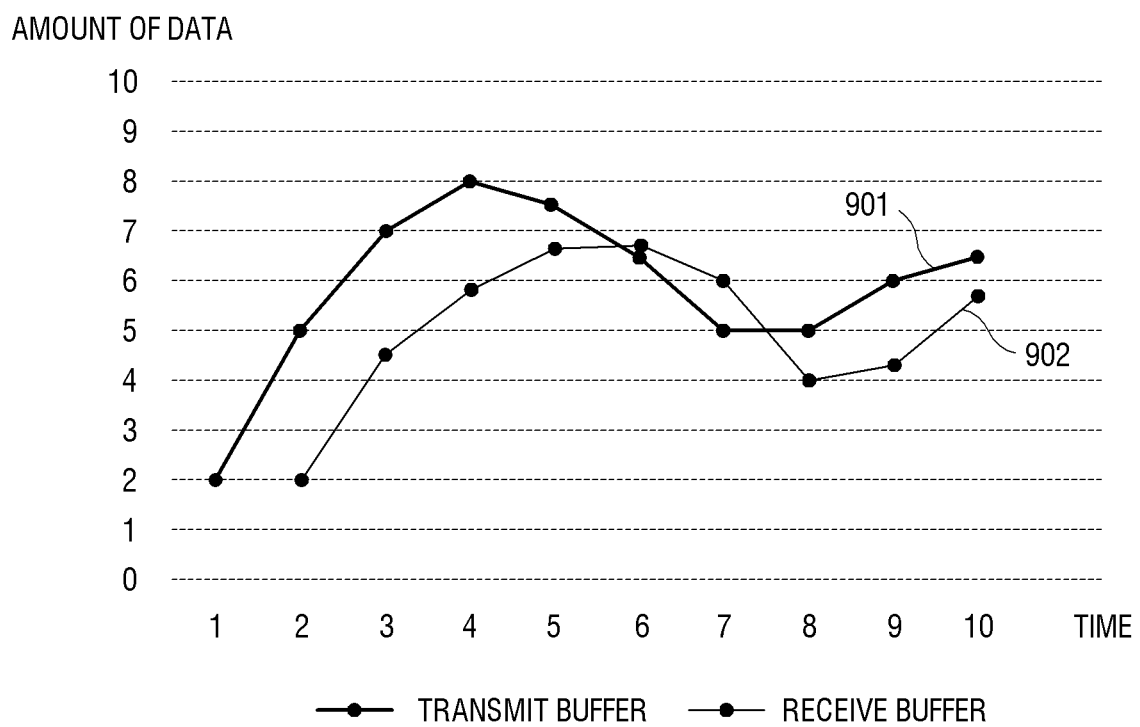
FIG. 9 is a view illustrating an example of a change in the amount of data stored in a transmit buffer and a receive buffer according to an embodiment of the present disclosure.

For example, as illustrated in FIG. 9, when the change in the amount of data transmitted from the transmit buffer 132 over time is grasped as in graph 901, and the change in the amount of data stored in the receive buffer 133 is grasped as in graph 902, the processor 104 identifies that the continuity of the processing of the second data is not limited. The graph 901 may represent the change in the amount of the first data of the video signal to be transmitted from the interface unit 103 to the security processing module 200, and the graph 902 may represent the change in the amount of the second data of the video signal transmitted from the security processing module 200 to the interface unit 103. If the change in the amounts of two data are identified as having the correlation or correspondence at a predetermined time interval as illustrated in FIG. 9, after the first data is transmitted from the interface unit 103 to the security processing module 200 and processed, it may be determined that the transmission flow of the second data from the security processing module 200 to the interface unit 103 is smooth. In that case, the processor 104 does not need to perform a separate subsequent process accordingly.

As an example of the method of determining whether there is the correlation or correspondence between the change in the amount of the first data and the change in the amount of the second data, the processor 104 may determine whether there is the correlation or correspondence between the amount of the first data at a certain time t and the amount of the second data at a time t+d (time after a d time lapses from the time t) to determine whether there is the correlation or correspondence between the change in the amount of the first data and the change in the amount of the second data. However, the method of determining the correlation or correspondence between the amounts of two data is not limited thereto.

Figure 10:
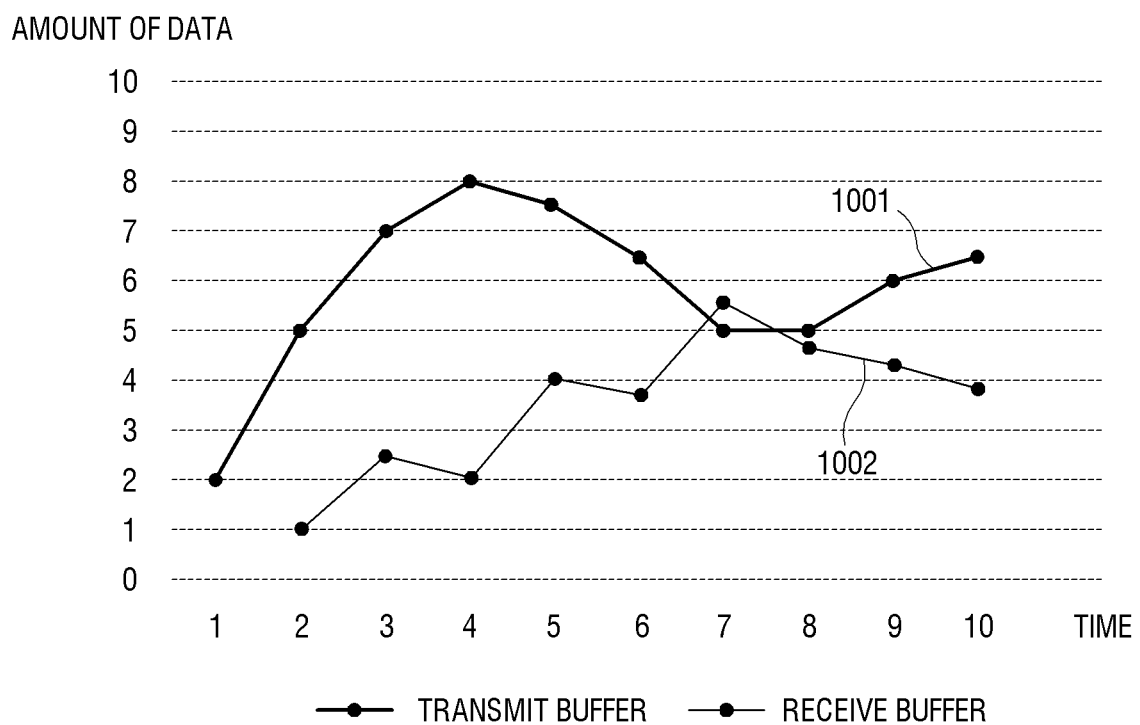
FIG. 10 is a diagram illustrating another example of change in the amount of data stored in the transmit buffer and the receive buffer according to the embodiment of the present disclosure.

On the other hand, as illustrated in FIG. 10, when the change in the amount of data transmitted from the transmit buffer 132 over time is grasped as in graph 1001, and the change in the amount of data stored in the receive buffer 133 is grasped as in graph 1002, the processor 104 identifies that the continuity of the processing of the second data is limited or is at least highly likely to be limited. Between the graphs 1001 and 1002 in FIG. 10, it is not identified that there is a correlation with a predetermined time interval, such as between the graphs 901 and 902 in FIG. 9. This is because it may be determined that the first data is transmitted from the interface unit 103 to the security processing module 200 and processed, and then there is a problem in the transmission flow of the second data from the security processing module 200 to the interface unit 103. In that case, the processor 104 may perform a separate subsequent process accordingly. The subsequent processing will be described later.

As a result, it may be easily identified whether the continuity of the video processing is limited based on the change in the data transmission amount.

As another example of identifying whether the continuity of the processing of the second data by the signal processing unit 102 is limited, the processor 104 may identify whether the continuity of the processing of the second data is limited based on the change in time required for the data transmitted from the transmit buffer 132 to reach the receive buffer 133 through the security processing module 200. This will be described with reference to FIGS. 11 and 12.

The processor 104 of the electronic apparatus 100 according to the present embodiment monitors the interface unit 103 to measure the time it takes for each data (A, B, C, D, and the like in FIGS. 11 and 12) transmitted from the transmit buffer 132 of the interface 103 to be secured by the security processing module 200 and received by the receive buffer 133 of the interface 103. The processor 104 identifies whether the continuity of the processing of the second data is limited based on the change in the measured time.

As an example of the method of identifying whether the continuity of the processing of the second data is limited based on the change in the measured required time, the processor 104 determines whether a standard deviation of the measured time required for each data is greater than or equal to a predetermined value to identify whether the continuity of the processing of the second data is limited.

Figure 11:
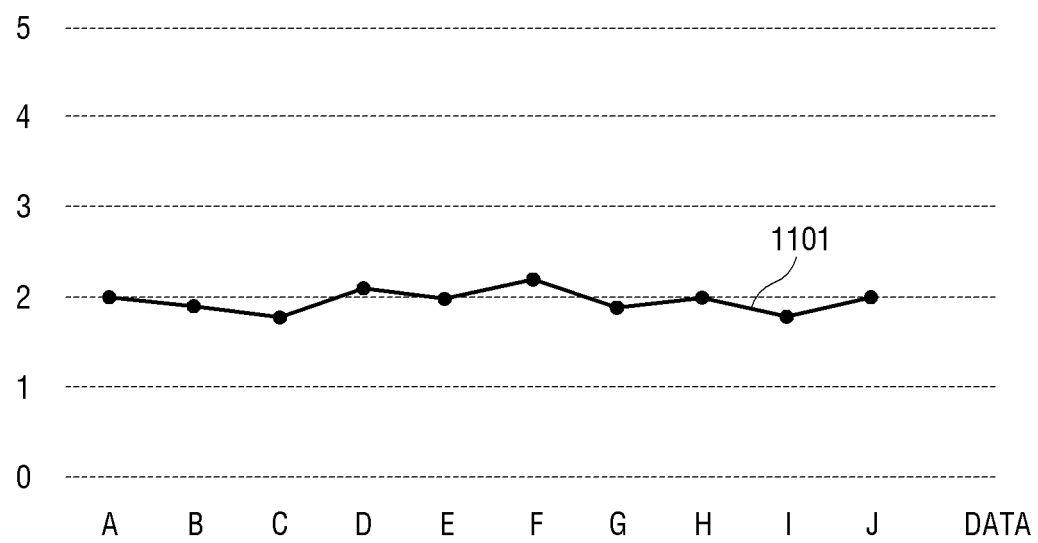
FIG. 11 is a diagram illustrating an example of a change in time required for data processing according to an embodiment of the present disclosure.

For example, as illustrated in FIG. 11, when the change in the time required for the data transmitted from the transmit buffer 132 to reach the receive buffer 133 through the security processing module 200 is grasped in the form of the graph 1101, the processor 104 identifies that the continuity of the processing of the second data is not limited. According to the graph 1101, the time required for each data stored in the transmit buffer 132 to reach the receive buffer 133 through the security processing module 200 is maintained at about 2 ms or so, so that it may be determined that the first data is transmitted from the interface unit 103 to the security processing module 200 and processed and then the transmission flow of the second data transmitted from the security processing module 200 to the interface unit 103 is smooth. In this case, the processor 104 may check that the standard deviation of the measured required time value for each data is less than the predetermined value to identify that the continuity of the processing of the second data is not limited. In that case, the processor 104 does not need to perform a separate subsequent process accordingly.

Figure 12:
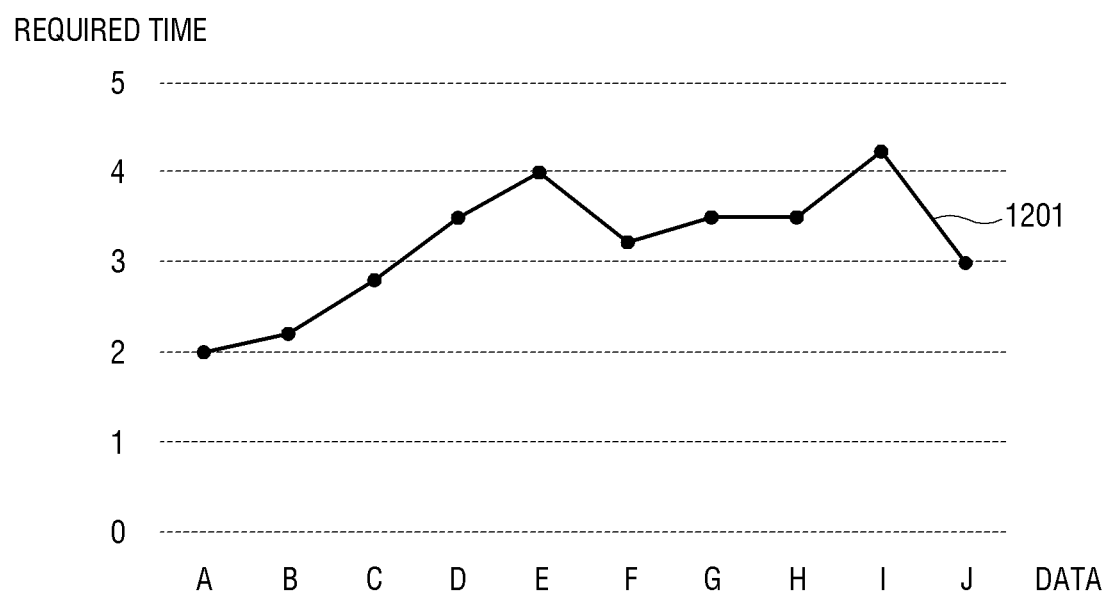
FIG. 12 is a diagram illustrating another example of the change in time required for data processing according to the embodiment of the present disclosure.

On the other hand, as illustrated in FIG. 12, when the change in time required for the data transmitted from the transmit buffer 132 to reach the receive buffer 133 through the security processing module 200 is grasped in the form of a graph 1201, the processor 104 checks that the standard deviation of the required time value measured for each data is greater than or equal to the predetermined value to identify that the continuity of the processing of the second data is limited or is at least highly likely to be limited According to the graph 1201, it can be seen that the time required for the data transmitted from the transmit buffer 132 to reach the receive buffer 133 through the security processing module 200 is inconsistent, and furthermore, the required time tends to gradually increases. Therefore, if the standard deviation of each required time value is calculated, the standard deviation may be greater than or equal to the predetermined value. This may be the basis for determining that there is a problem in the flow in which the first data is transmitted from the interface unit 103 to the security processing module 200 and then the second data is transmitted from the security processing module 200 to the interface unit 103. In that case, the processor 104 may perform the separate subsequent process accordingly. The subsequent processing will be described later.

In the above, as an example of the method of identifying whether the continuity of the processing of the second data is limited based on the change in the measured time required, the method of determining, by the processor 104, whether the standard deviation of the required time value measured for each data is greater than or equal to the predetermined value is described, but the method of identifying whether the continuity of the processing of the second data is limited based on the change in the measured time required is not limited thereto. As another example, the processor 104 may identify whether the continuity is limited based on whether an average value of the measured time value is greater than or equal to a predetermined value, or another method of measuring a degree of variation in other required time can be used.

As a result, it may be easily identified whether the continuity of the video processing is limited based on the time required for the data transmission.

The processor 104 may identify whether the continuity of the processing of the second data is limited in response to an occurrence of a predetermined event. Here, the event means the situation in which the transmission amounts of the first data or the second data can be changed, and includes, for example, start and stop, resumption, termination of services using various video signals such as real-time broadcast playback, real-time broadcast recording, IPTV viewing, and OTT content viewing, playback and termination of video content, channel switching, receipt of user input corresponding to each of them, and the like. As an example of identifying whether the continuity of the processing of the second data is limited in response to the occurrence of the predetermined event, the processor 104 may respond to receiving a request for processing the second video signal during the processing of the first video signal to identify whether the continuity of the processing of the second data of the first video signal or the second data processing of the second video signal is limited. That is, in response to an event in which one video signal is received while another video signal is received, the processor 104 may identify whether the continuity of the processing of the second data is limited.

Figure 4:
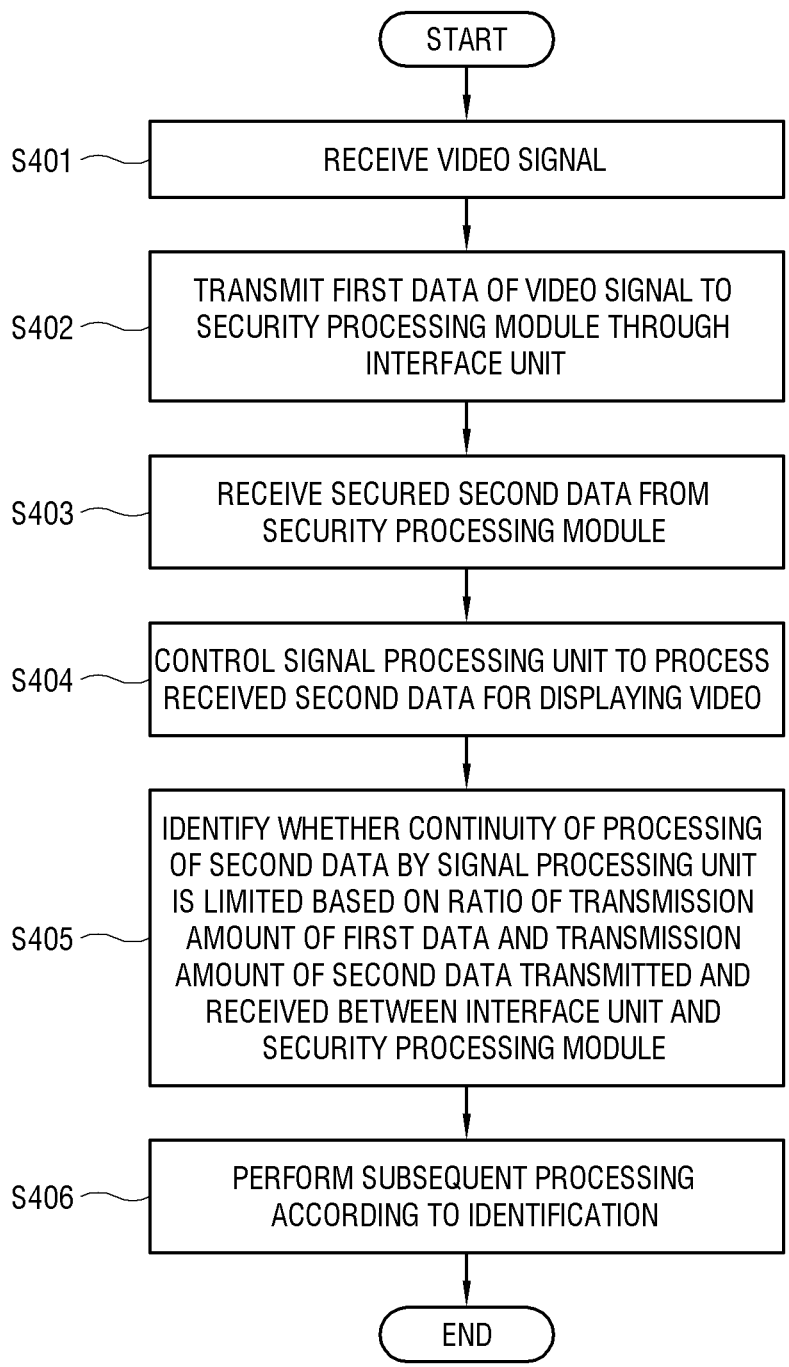
FIG. 4 is a diagram illustrating an operation of the electronic apparatus according to the embodiment of the present disclosure.
Figure 15:
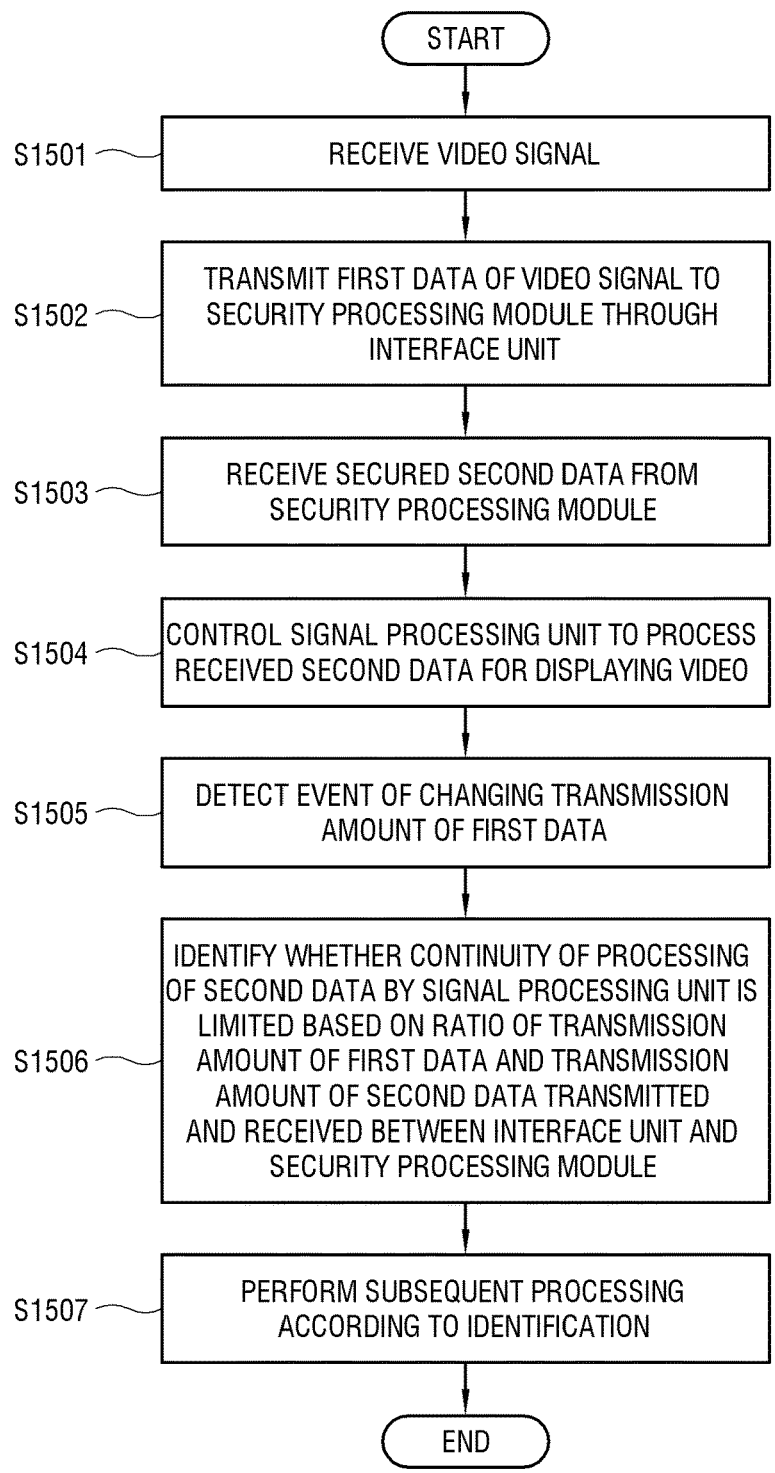
FIG. 15 is a diagram illustrating an operation of an electronic apparatus according to another embodiment of the present disclosure.

FIG. 15 is a view illustrating an operation of the processor 104 according to the embodiment for identifying whether the continuity of the processing of the second data is limited in response to the occurrence of the predetermined event, in which S1501 to S1504 are the same as S401 to S404 in FIG. 4. Thereafter, the processor 104 detects an event of changing the transmission amounts of the first data or the second data (S1505). When the event is detected, the processor 104 identifies whether the continuity of the processing of the second data by the signal processing unit 102 is limited based on the changes in the transmission amounts of the first data or the second data transmitted and received between the interface unit 103 and the security processing module 200 (S1506), and performs the subsequent processing according to the identification (S1507).

The processor 104 according to the present embodiment may operate by further including the event detection unit 301 and the identification unit 302 as illustrated in FIG. 3. The event detection unit 301 detects whether the event has occurred and transmits a signal instructing the identification unit 302 to start the identification when the event is detected. The identification unit 302 identifies whether the continuity of the processing of the second data is limited by a predetermined method according to the signal, for example, by the method of monitoring the buffer 131 of the interface unit 103 as described above with reference to FIGS. 9 to 12, and the like. The identification unit 302 may transmit the identification result to the event detection unit 301 to perform the subsequent processing. Alternatively, the identification unit 302 may directly perform the subsequent processing according to the identification result.

As a result, it is possible to utilize the resources of the electronic apparatus 100 more efficiently than in the case of constantly identifying whether the continuity is limited.

Here, the identification result may include monitoring results for each data pipe 503 and 504 corresponding to each video signal or video data. The monitoring results may include, for example, a change in bandwidth of each data pipe, a change in a state of buffers corresponding to each data pipe, a change in the amount of data stored in the buffer, the time it takes for data to be transmitted from the transmit buffer to reach the receive the receive buffer, and the like. Furthermore, the identification result may include the determination result on whether the continuity of the processing of the second data is limited for each service corresponding to each video signal or video data based on the monitoring result.

As an example of the subsequent processing according to the identification result, the processor 104 may stop an operation of a service identified that the continuity of the processing of the second data is limited, for example, a service corresponding to a specific event or a service corresponding to a predetermined video signal or video data. Alternatively, the processor 104 may set the identified service as a subordination to other services to be processed. Alternatively, the processor 104 may not stop the identified service, but stop the operation of other services that are determined to have a lower priority than the identified service, or set the other services as a subordination to be processed. As a result, when there is a possibility that the continuity of the processing may be limited, the operation of the specific service may be stopped in advance or processed as a subordination, so video can be continuously processed and played.

As another example of the subsequent processing according to the identification result, when the processor 104 according to the embodiment of the present disclosure identifies that the continuity of the processing of the second data by the signal processing unit 102 may be limited or is likely to be limited, the processor 104 may display the identification result through the display unit or the display device. Furthermore, the electronic apparatus 100 may further include a user input unit that receives a user input, and the processor 104 may perform the subsequent processing based on the identification result according to the user input received through the user input unit. In that case, the processor 104 may display a user interface (UI) including an item capable of selecting whether to perform the second data processing. The user input unit may be implemented to receive a touch input, a remote control input, a voice input, a gesture input, and the like, but the form of possible input through the user input unit is not limited thereto.

Figure 13:
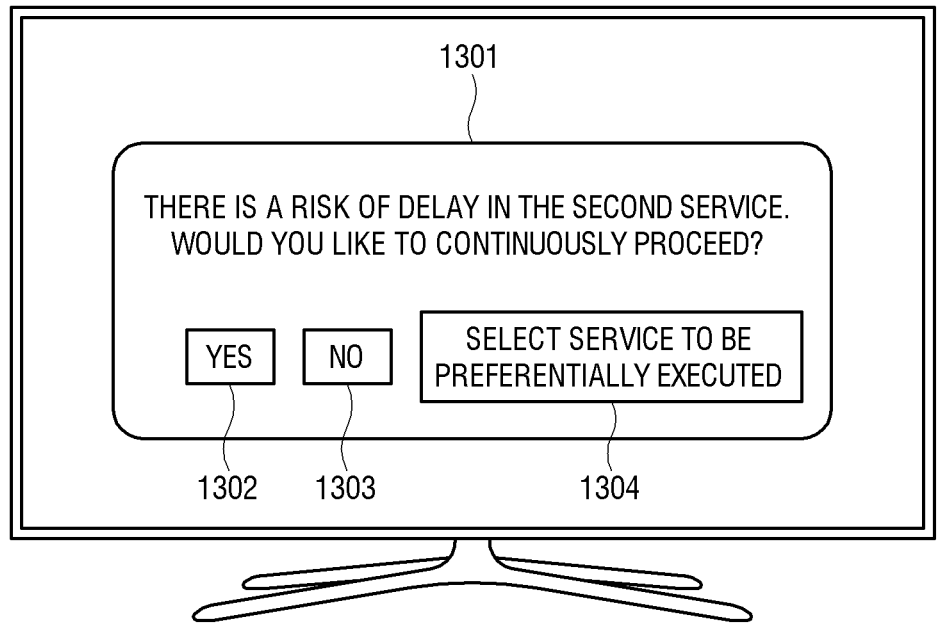
FIG. 13 is a diagram illustrating an example of displaying an identification result by the electronic apparatus according to the embodiment of the present disclosure.

For example, as a result of determining, by the processor 104, whether the continuity of the processing of the second data is limited based on the ratio of the transmission amount of the first data and the transmission amount of the second data transmitted and received between the interface unit 103 and the security processing module 200, when it is identified that the continuity of the processing of the second data by the signal processing unit 102 is limited or is likely to be limited, the processor 104 may display a message 1301 notifying the identification result as illustrated in FIG. 13. Furthermore, the processor 104 may display UIs 1302 to 1304 which the user may select through the user input unit in relation to whether to continuously perform the service, whether not to perform the service, whether to perform a service by a method of selecting a service to be preferentially performed, and the like. However, FIG. 13 is only an example, and the display form of the identification result display form, the content of the message 1301, the type, form, and contents of the UI 1302-1304, and the like are not limited to the example of FIG. 13.

Figure 14:
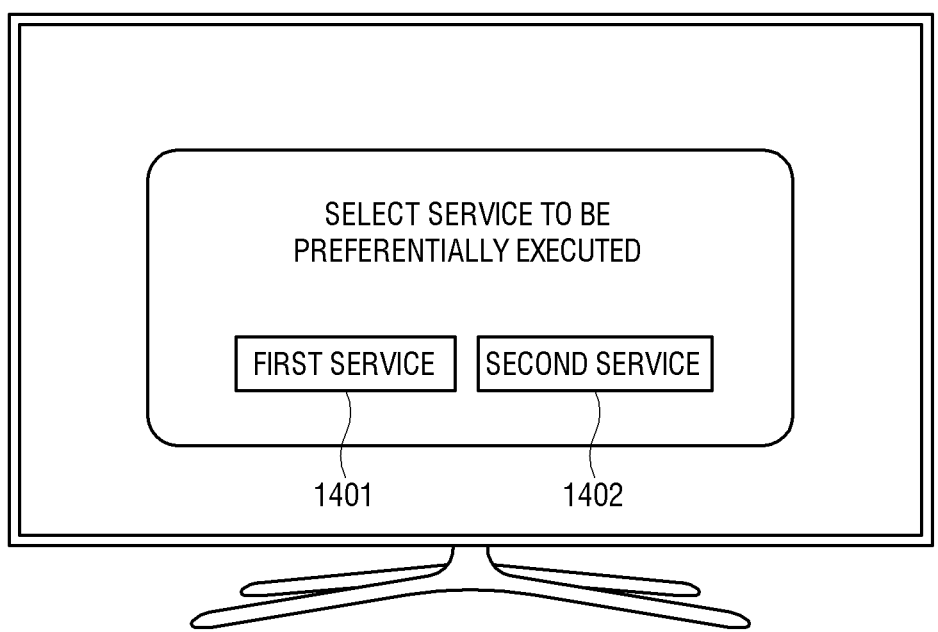
FIG. 14 is a diagram illustrating another example of displaying the identification result by the electronic apparatus according to the embodiment of the present disclosure.

When a user input for selecting a UI 1304 corresponding to an option for selecting a service to be preferentially performed by the user is received, the processor 104 may further display UIs 1401 and 1402 including an item which the user may select in relation to a service to be preferentially performed among currently running services as illustrated in FIG. 14.

When the user selects one service to be preferentially performed according to the UIs, for example, in FIG. 14, when selecting the UI 1401 that selects a first service to be preferentially executed, the processor 104 may control the first service to be preferentially executed. For example, the processor 104 may control the first service to be preferentially performed by stopping or terminating a service corresponding to a second service.

As a result, when it is identified that the continuity of the processing of the data is limited, it is possible to perform the subsequent processing more suited to a user's intention.

The processor 104 of the electronic apparatus 100 according to another embodiment of the present disclosure may identify whether the continuity of the processing of the second data by the signal processing unit 102 is limited based on a trend of change in a relationship of the transmission amount of the second data with respect to the transmission amount of the first data.

For example, when the second video signal is received during the reception of the first video signal, the transmission amounts of the first data and the second data corresponding to each video signal transmitted and received by the data pipes 503 and 504 between the interface unit 103 and the security processing module 200 may be changed, but when the change is a temporary phenomenon, the continuity of the processing of the second data by the signal processing unit 102 may not be limited. To identify whether the continuity is limited in consideration of such a situation, the processor 104 may determine whether the continuity is limited based on the trend of the change in the relationship of the transmission amount of the second data with respect to the transmission amount of the first data. For example, the processor 104 monitors how long the change is lasted, how much the change is compared to the existing transmission amount, whether the degree of change is getting larger or smaller, and the like, and then it is possible to identify whether the continuity of the processing of the second data is limited based on the monitored result.

As a result, the reliability of discrimination on whether the continuity of the processing of the data is limited is improved.

The signal processing unit 102 of the electronic apparatus 100 according to another embodiment of the present disclosure may further include the buffer capable of storing the second data, and the processor 104 may identify whether the continuity of the processing of the second data by the signal processing unit 102 is limited according to the capacity of the buffer in the signal processing unit 102.

When the buffer exists in the signal processing unit 102, the larger the capacity of the buffer, the situation in which the continuity of the processing of the second data is limited may be reduced. For example, when a considerable amount of second data that needs to be processed by the signal processing unit 102 is stored in the buffer in the signal processing unit 102, even if the transmission amount of the second data transmitted from the security processing module 200 to the interface unit 103 is temporarily reduced, the continuity of the processing may be maintained while performing the processing through the second data in the buffer in the signal processing unit 102 for a predetermined time, and the time required for the change in the transmission amount of the second data from the security processing module 200 to be originally recovered may be secured.

As a result, it is possible to improve the reliability of discrimination on whether the continuity of the processing of the data is limited according to the hardware characteristics of the electronic apparatus.

Figure 16:
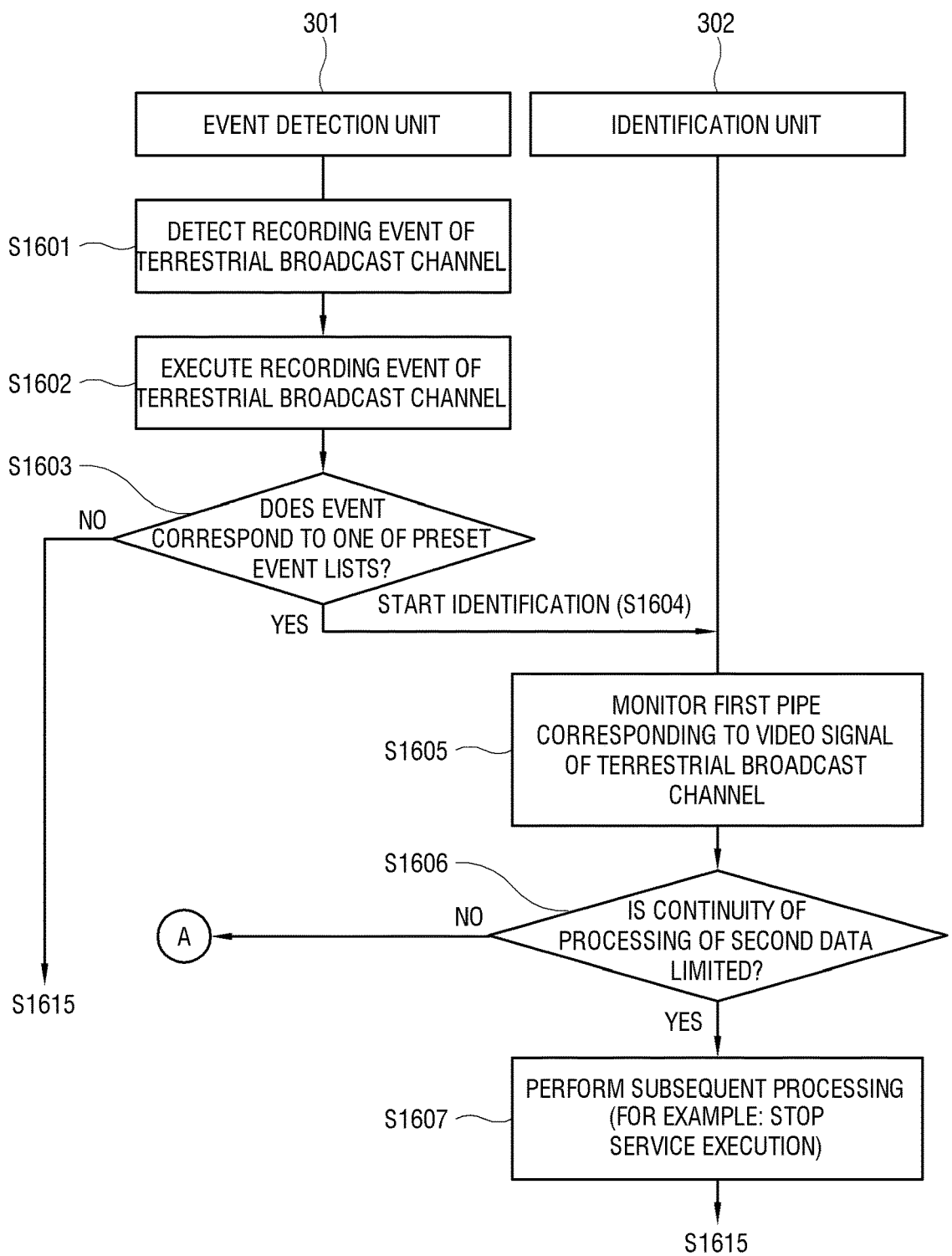
FIGS. 16 and 17 are diagrams illustrating specific operating scenarios of the processor according to the embodiment of the present disclosure.
Figure 17:
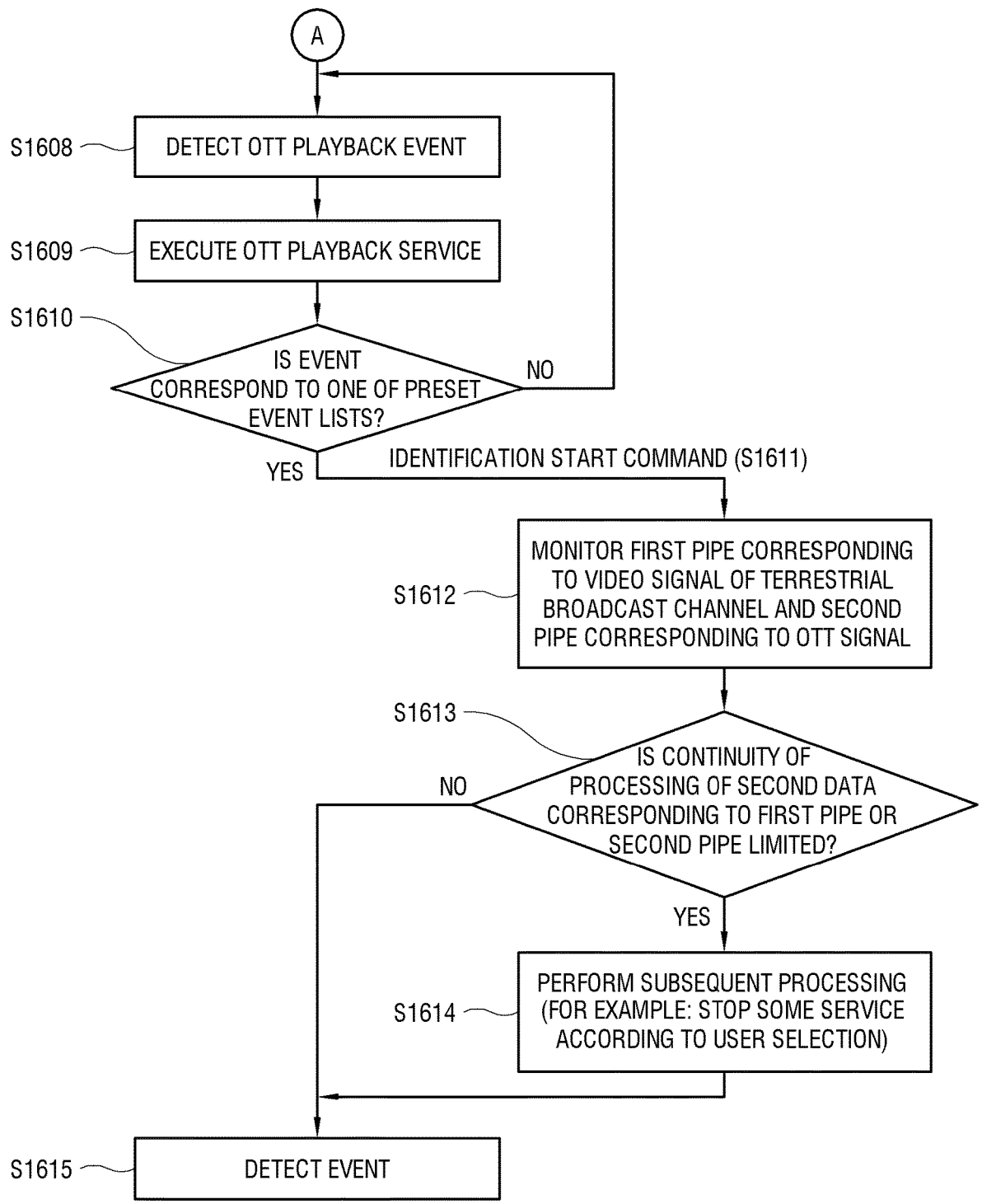

Hereinafter, the operations of the processor 104 and the event detection unit 301 and the identification unit 302 executed by the processor 104 according to the embodiment of the present disclosure will be described based on the detailed scenario with reference to FIGS. 16 to 17. However, the following scenario is only for explaining the operation of the present disclosure, and the present disclosure is not limited thereto.

The event detection unit 301 executed by the processor 104 according to the embodiment of the present disclosure detects whether the event has occurred.

When a user command to start a recording service of a terrestrial broadcast channel is input from the user through the user input unit, the event detection unit 301 detects the input of the user command (S1601), and then executes the recording service of the terrestrial broadcast channel according to the input (S1602).

In addition, the event detection unit 301 determines whether the user command is an event corresponding to one of lists of preset events (for example, real-time broadcast playback, recording, channel switching, and the like) (S1603), when it is determined to be the event corresponding to the list, the event detection unit 301 transmits a signal instructing the identification unit 302 to start identification (S1604).

The identification unit 302 receiving the above signal monitors the first pipe corresponding to the video signal of the terrestrial broadcast channel input by the user among the data pipes between the interface unit 103 and the security processing module 200 (S1605) to identify whether the continuity of the processing of the second data of the above video signal by the signal processing unit 102 is limited due to the recording service of the terrestrial broadcast channel (S1606). For example, the identification unit 302 compares the change in the amount of data transmitted from the transmit buffer corresponding to the first pipe and the change in the amount of data stored in the receive buffer, before and after the execution of the service to determine whether there is a correlation between the two changes. When it is determined that there is the correlation, the identification unit 302 identifies that the continuity of the processing of the second data is not limited due to the execution of the above service (No in S1606) and maintains the above service execution according to the identification result. When it is determined that there is no correlation, the identification unit 302 identifies that the continuity of the processing of the second data is limited due to the execution of the above service (Yes in S1606), and executes the subsequent processing according to the identification result, for example, does not execute the above service or displays the identification result on the display unit and then displays a UI including an item that the user can select whether to execute the above service despite the risk of the limitation of the continuity (S1607).

Hereinafter, a description will made on the assumption that it is determined that the continuity of the processing of the second data is not limited due to the execution of the recording service of the terrestrial broadcast channel, and that the execution of the above service is maintained.

During the execution of the recording service of the terrestrial broadcast channel, when the user command to start the OTT playback service from the user through the user input unit and to operate the recording service of the terrestrial broadcast channel in a background mode is input, the event detection unit 301 detects the input of the user command (S1608), and then executes the OTT playback service according to the input (S1609).

In addition, the event detection unit 301 determines whether the above user command is the event corresponding to one of the lists of the preset events (for example, real-time broadcast playback, recording, channel switching, and the like as the event of changing the transmission amount of the first data of the video signal) (S1610). When it is determined to be the event corresponding to the above list, the event detection unit 301 transmits a signal instructing the identification unit 302 to start the identification (S1611).

The identification unit 302 receiving the above signal monitors the first pipe corresponding to the currently recording terrestrial broadcast signal and the second pipe corresponding to the video signal of the OTT input by the user (S1612) among the data pipes between the interface unit 103 and the security processing module 200 to identify whether the continuity of the processing of the second data of the above video signal by the signal processing unit 102 or the second data processing of the existing terrestrial broadcast signal is limited due to the OTT playback service (S1613). For example, the identification unit 302 compares the change in the amount of data transmitted from the transmit buffer corresponding to the second pipe and the change in the amount of data stored in the receive buffer, before and after the execution of the OTT playback service to determine whether there is a correlation between the two changes. Furthermore, the identification unit 302 compares the change in the amount of data transmitted from the transmit buffer corresponding to the existing first pipe (other than the second pipe) and the change in the amount of data stored in the receive buffer, before and after the execution of the above service to determine whether there is a correlation between the two changes.

If it is determined that there is a correlation between the changes in the buffer corresponding to the first pipe and it is determined that there is also a correlation between the changes in the buffer corresponding to the second pipe, the identification unit 302 may identify that the continuity of the processing of the second data of each video signal is not limited even if the recording service of the terrestrial broadcast channel and the OTT playback service are executed at the same time (No in S1613), which means that even if both services are executed simultaneously, there is no interruption in video recording and playback, so the processor 104 maintains the execution of both services.

On the other hand, if it is determined that there is no correlation between the changes in the buffer for any one of the two pipes, the identification unit 302 identifies that the continuity of the processing of the second data of the video signal corresponding to the pipe is limited (Yes in S1613), and processes the subsequent processing (S1614).

As an example of the subsequent processing, the processor 104 may stop a service corresponding to the video signal identified as having a limitation in the continuity of processing. As another example, the processor 104 may stop a service having a lower priority among the two services. As another example, as illustrated in FIGS. 13 to 14, the processor 104 indicates that the transmission delay may occur in the corresponding service or another service due to the execution of the OTT playback service according to the user input, and as a result, the subsequent processing may also be performed according to the user input.

What is claimed is:

1. An electronic apparatus, comprising:
   a signal receiver configured to receive a video signal;
   an interface configured to communicate with a security processing module;
   a signal processor; and
   a processor configured to:
      transmit first data of the video signal received by the signal receiver to the security processing module through the interface and receive secured second data from the security processing module;
      control the signal processor to process the received second data for displaying a video;
      identify whether continuity of processing of the second data by the signal processor is limited based on a ratio of a transmission amount of the first data and a transmission amount of the second data transmitted and received between the interface and the security processing module; and
      perform subsequent processing according to the identification.

2. The electronic apparatus of claim 1, wherein the processor is configured to identify whether the continuity of the processing of the second data is limited based on a change in the ratio of the transmission amount of the first data and the transmission amount of the second data.

3. The electronic apparatus of claim 1, wherein the interface includes a transmit buffer in which the first data to be transmitted to the security processing module is stored and a receive buffer in which the second data transmitted from the security processing module is stored, and
   the processor is configured to compare a change in an amount of data transmitted from the transmit buffer with a change in an amount of data stored in the receive buffer to identify whether the continuity of the processing of the second data is limited.

4. The electronic apparatus of claim 3, wherein the processor is configured to identify whether the continuity of the processing of the second data is limited based on a change in time required for the data transmitted from the transmit buffer to reach the receive buffer through the security processing module.

5. The electronic apparatus of claim 1, wherein the processor is configured to identify whether the continuity of the processing of the second data by the signal processor is limited in response to an occurrence of an event of changing the transmission amount of the first data or the second data of the video signal.

6. The electronic apparatus of claim 1, wherein the processor is configured to identify whether the continuity of the processing of the second data of a first video signal or the processing of the second data of a second video signal by the signal processor is limited in response to a request to process the second video signal during a processing of the first video signal.

7. The electronic apparatus of claim 1, further comprising:
   a display,
   wherein the subsequent processing includes displaying the identification result through the display.

8. The electronic apparatus of claim 1, further comprising:
   a user input device,
   wherein the processor is configured to perform the subsequent processing according to a user input received through the user input device in response to the limitation of the continuity.

9. The electronic apparatus of claim 1, wherein the processor is configured to identify whether the continuity of the processing of the second data by the signal processor is limited based on a trend of change in a relationship of the transmission amount of the second data with respect to the transmission amount of the first data.

10. A control method of an electronic apparatus including an interface that communicates with a security processing module, comprising:
    receiving a video signal;
    transmitting first data of the received video signal to the security processing module through the interface;
    receiving secured second data from the security processing module;
    processing the received second data for displaying a video;
    identifying whether continuity of processing of second data is limited based on a ratio of a transmission amount of the first data and a transmission amount of the second data transmitted and received between the interface and the security processing module; and
    performing subsequent processing according to the identification.

11. The control method of claim 10, wherein the identifying comprises identifying whether the continuity of the processing of the second data is limited based on a change in the ratio of the transmission amount of the first data and the transmission amount of the second data.

12. The control method of claim 10, wherein the interface includes a transmit buffer in which the first data to be transmitted to the security processing module is stored and a receive buffer in which the second data transmitted from the security processing module is stored, and
    the identifying comprises identifying whether the continuity of the processing of the second data is limited by comparing a change in an amount of data transmitted from the transmit buffer with a change in an amount of data stored in the receive buffer.

13. The control method of claim 12, wherein the identifying comprises identifying whether the continuity of the processing of the second data is limited based on a change in time required for the data transmitted from the transmit buffer to reach the receive buffer through the security processing module.

14. The control method of claim 10, wherein the identifying comprises identifying whether the continuity of the processing of the second data is limited in response to an occurrence of an event of changing the transmission amount of the first data or the second data of the video signal.

15. The control method of claim 10, wherein the identifying comprises identifying whether the continuity of the processing of the second data of a first video signal or the processing of the second data of a second video signal is limited in response to a request to process the second video signal during the processing of the first video signal.

\* \* \* \* \*